(12) United States Patent
Labat et al.

(10) Patent No.: US 9,752,859 B2
(45) Date of Patent: *Sep. 5, 2017

(54) VALVE STEM NUT WEAR ANALYSIS APPARATUS AND METHOD

(71) Applicants: LOOP LLC, Covington, LA (US); SHAW INTELLECTUAL PROPERTY HOLDINGS, LLC, Baton Rouge, LA (US)

(72) Inventors: Chris A. Labat, Thibodaux, LA (US); Carter Reames, Jr., Gonzales, LA (US)

(73) Assignees: LOOP LLC, Covington, LA (US); SHAW INTELLECTUAL PROPERTY HOLDINGS, LLC, Baton Rouge, LA (US)

( * ) Notice: Subject to any disclaimer, the term of this patent is extended or adjusted under 35 U.S.C. 154(b) by 533 days.

This patent is subject to a terminal disclaimer.

(21) Appl. No.: 14/244,646

(22) Filed: Apr. 3, 2014

(65) Prior Publication Data

US 2014/0299040 A1 Oct. 9, 2014

Related U.S. Application Data

(63) Continuation of application No. 13/659,582, filed on Oct. 24, 2012, now Pat. No. 8,733,269, which is a
(Continued)

(51) Int. Cl.
*F16K 37/00* (2006.01)
*G01B 5/30* (2006.01)
(Continued)

(52) U.S. Cl.
CPC .......... *G01B 5/163* (2013.01); *F16K 37/0083* (2013.01); *G01B 3/48* (2013.01); *G01D 5/02* (2013.01); *Y10T 137/8292* (2015.04)

(58) Field of Classification Search
CPC ....... F16K 37/00; F16K 37/0083; G01B 3/48; G01B 5/16; G01B 5/163; G01B 5/30; G01D 5/02; G01D 21/00
(Continued)

(56) References Cited

U.S. PATENT DOCUMENTS 2,880,518 A * 4/1959 Settele ...................... G01B 3/48
33/199 R
3,651,831 A * 3/1972 Gardner .................. F16K 35/04
137/588

(Continued)

FOREIGN PATENT DOCUMENTS

JP 04296268 A * 10/1992 ............. F16K 31/04
JP 09005064 A * 1/1997 ............. G01B 21/00
(Continued)

*Primary Examiner* — Richard A Smith
(74) *Attorney, Agent, or Firm* — Garvey, Smith & Nehrbass, Patent Attorneys, L.L.C.; Seth M. Nehrbass; Charles C. Garvey, Jr.

(57) ABSTRACT

A method and apparatus for measuring stem nut wear in a valve having a threaded valve stem that is positioned to engage the threads of a stem nut. In a preferred embodiment, a tool is mounted on the stem nut, wherein the tool rotates when the stem nut rotates. The tool indicates a measurement of stem nut rotation. An indicator indicates stem movement. The stem nut is rotated and the amount of percent wear is observed. Rotation continues until the stem begins to move. The tool provides a reading when the stem begins to move that indicates an amount of stem nut wear.

19 Claims, 24 Drawing Sheets

Related U.S. Application Data continuation of application No. 13/321,798, filed as application No. PCT/US2010/045914 on Aug. 18, 2010, now Pat. No. 8,322,298.

(60) Provisional application No. 61/370,739, filed on Aug. 4, 2010, provisional application No. 61/235,204, filed on Aug. 19, 2009.

(51) Int. Cl.
*G01B 5/16* (2006.01)
*G01B 3/48* (2006.01)
*G01D 5/02* (2006.01)

(58) Field of Classification Search
USPC .......... 116/201, 208, 277; 137/556.3, 556.6; 33/199 B, 199 R; 73/168
See application file for complete search history.

(56) References Cited

U.S. PATENT DOCUMENTS

| | | | | |
|---|---|---|---|---|
| 3,721,133 A | * | 3/1973 | Denkowski | F16H 25/2006 74/441 |
| 3,857,547 A | * | 12/1974 | Profet | F16H 25/2006 254/103 |
| 4,255,967 A | * | 3/1981 | Grymonprez et al. | F16K 17/04 116/277 |
| 4,337,649 A | * | 7/1982 | Stagg | G01M 13/02 73/115.01 |
| 5,224,512 A | * | 7/1993 | Nogami et al. | F16K 37/00 137/552 |
| 5,487,302 A | * | 1/1996 | Casada et al. | F16K 37/0083 73/168 |
| 5,620,166 A | * | 4/1997 | Lord et al. | F16K 31/04 251/129.12 |
| 5,690,146 A | * | 11/1997 | Stammen | F16L 11/124 116/208 |
| 6,799,928 B2 | * | 10/2004 | Port-Robach | G01B 7/284 116/208 |
| 7,549,440 B1 | * | 6/2009 | Campbell | F16K 37/0008 116/277 |
| 8,322,298 B2 | * | 12/2012 | Labat et al. | G01B 3/48 116/208 |
| 8,733,269 B2 | * | 5/2014 | Labat et al. | G01B 3/48 116/208 |
| 2002/0095986 A1 | * | 7/2002 | Ito | F16K 37/0083 73/168 |
| 2012/0160150 A1 | * | 6/2012 | Handfield | B62M 27/02 116/208 |

FOREIGN PATENT DOCUMENTS

| | | | | |
|---|---|---|---|---|
| JP | 10234155 A | * | 9/1998 | F16H 25/24 |
| JP | 2004144604 A | * | 5/2004 | G01B 5/00 |
| JP | 2010261587 A | * | 11/2010 | F16K 31/04 |

* cited by examiner

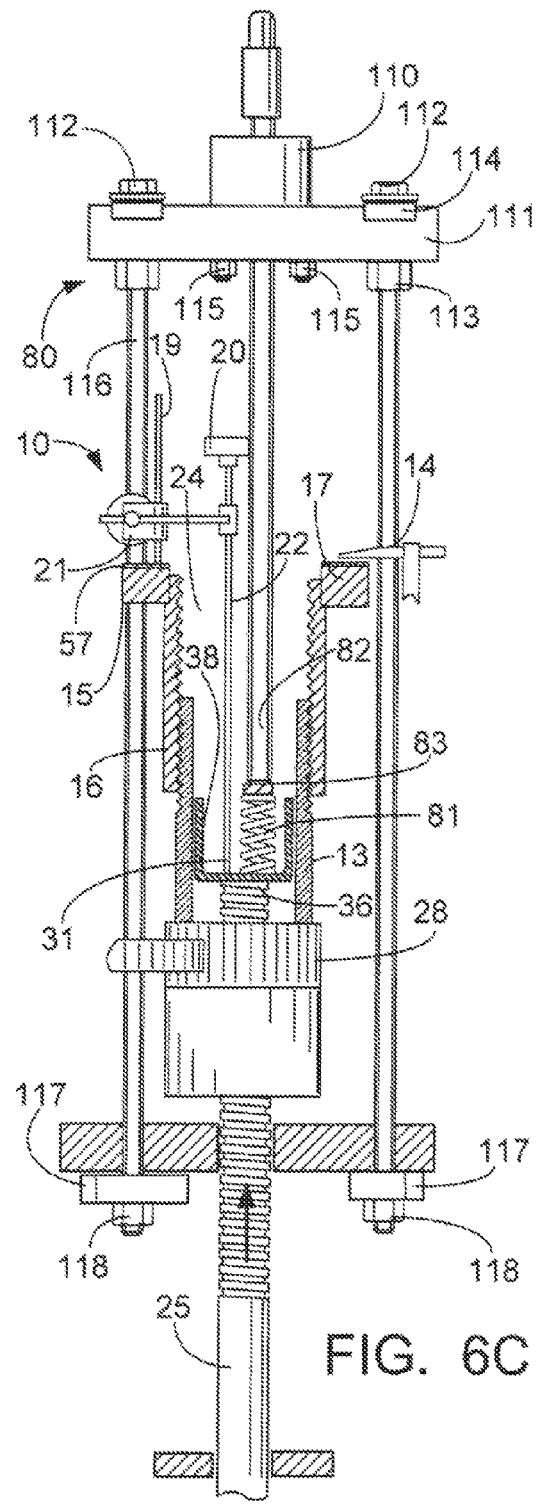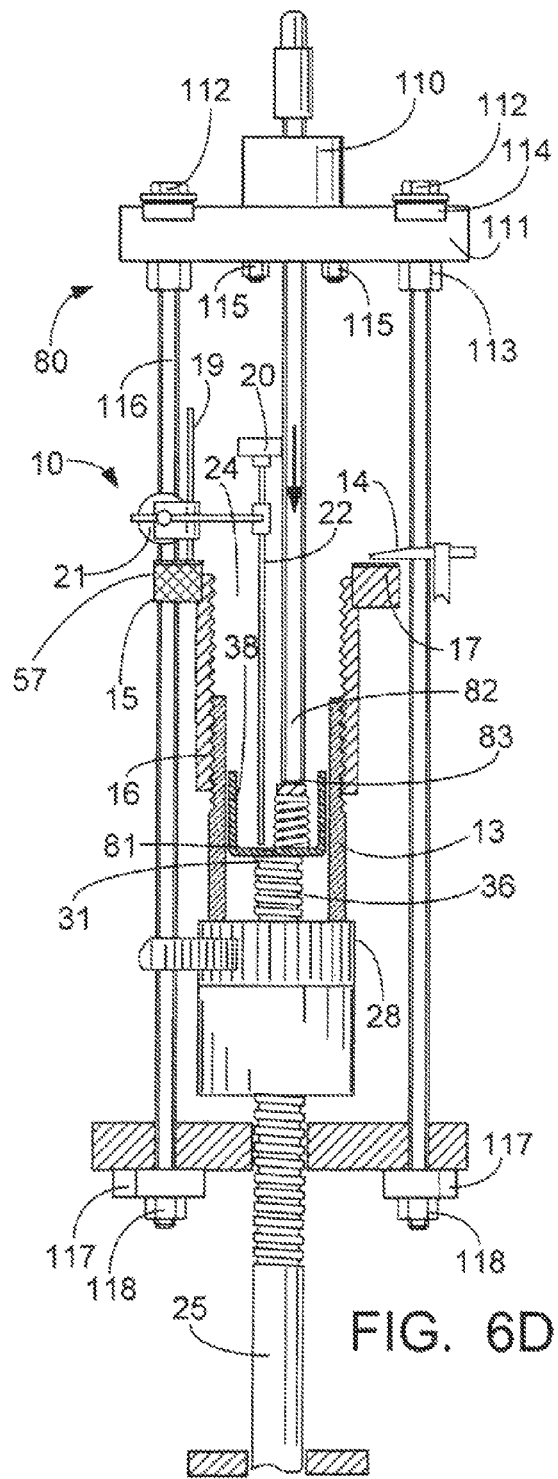

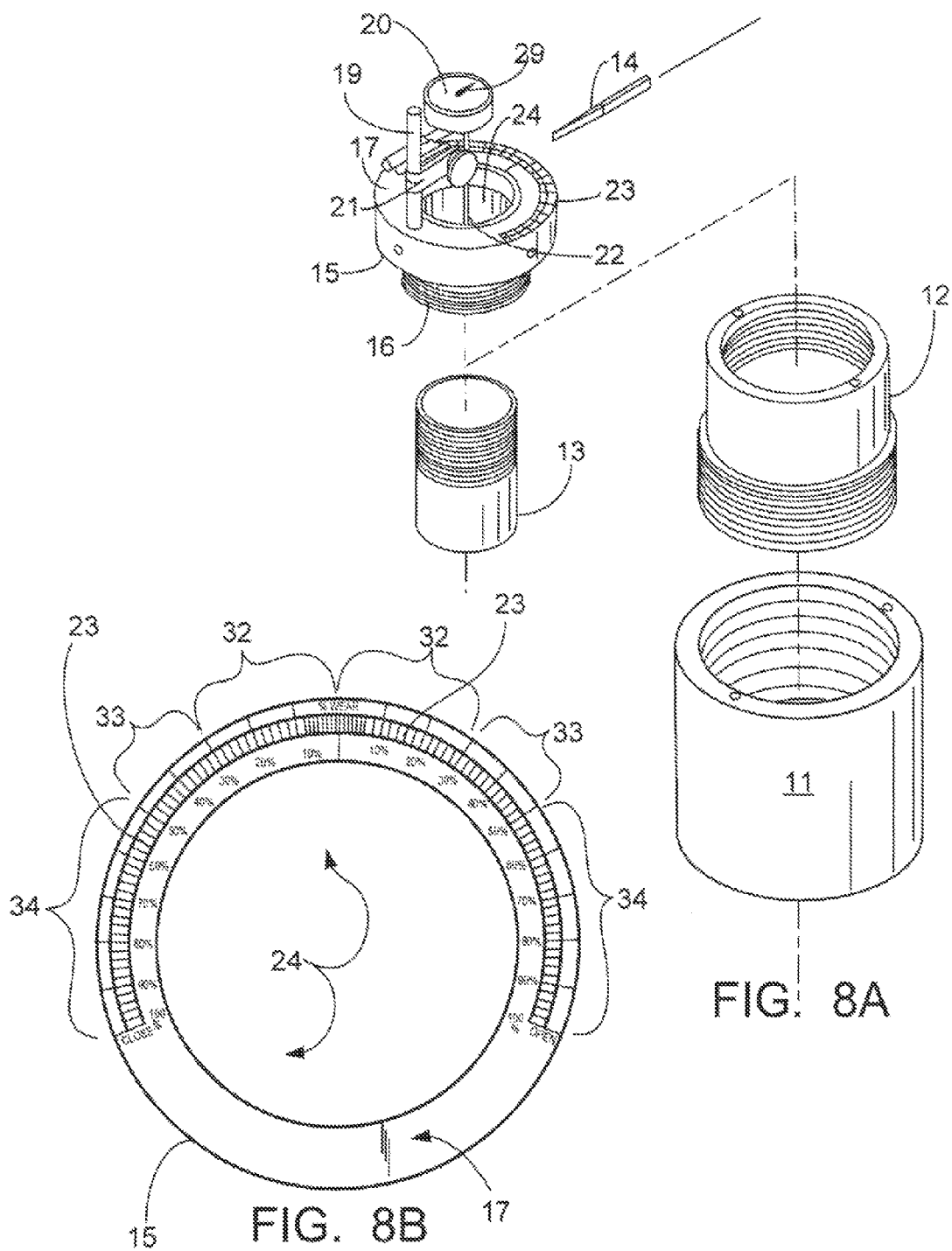

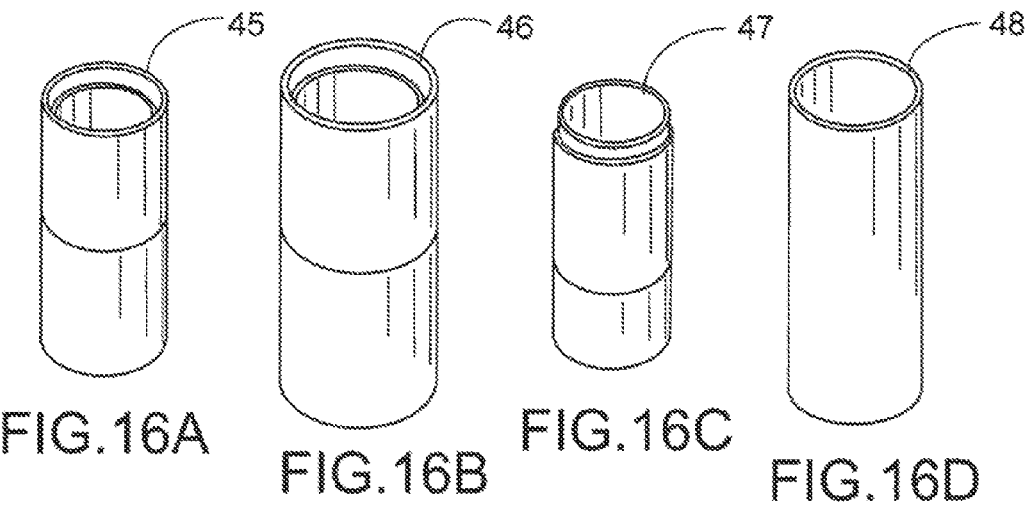
FIG.16A FIG.16B FIG.16C FIG.16D
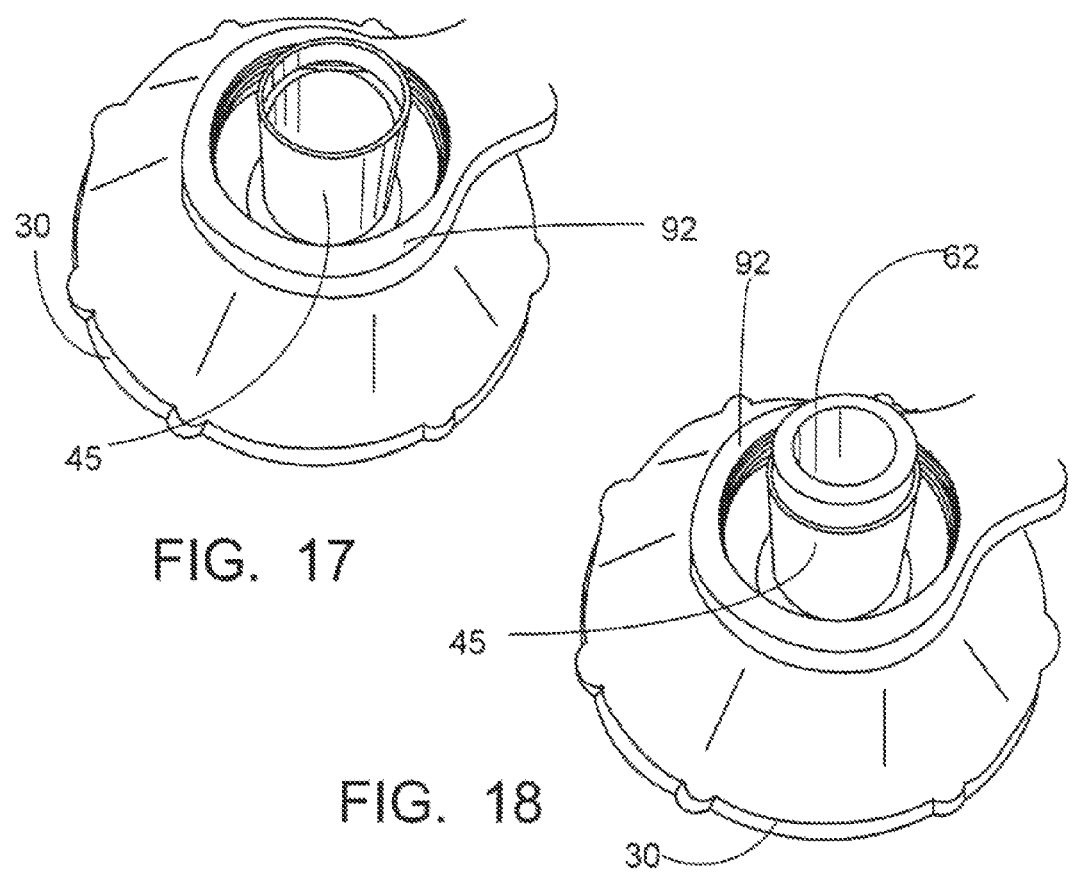
FIG. 17
FIG. 18

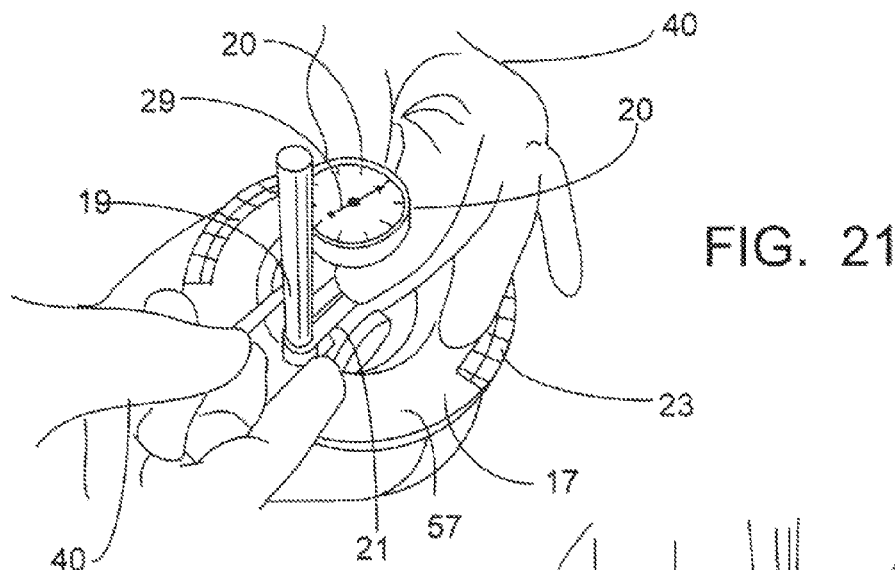
FIG. 21
FIG. 22
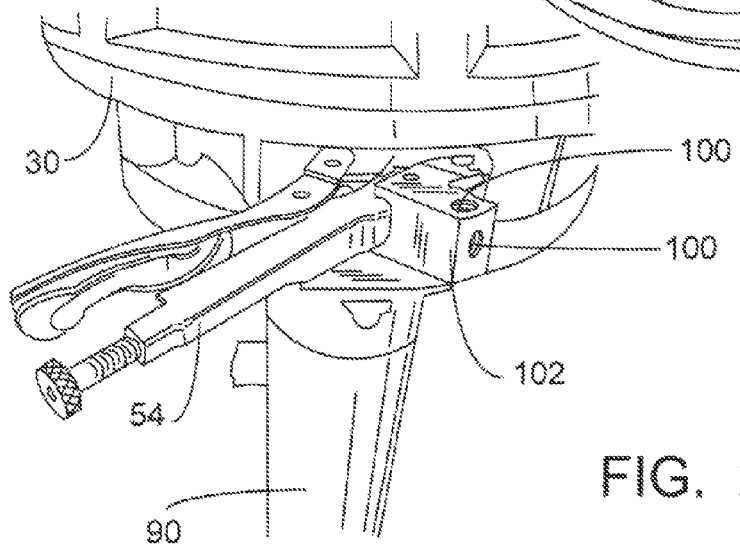
FIG. 23

VALVE STEM NUT WEAR ANALYSIS APPARATUS AND METHOD

CROSS-REFERENCE TO RELATED APPLICATIONS

This is a continuation of U.S. patent application Ser. No. 13/659,582, filed 24 Oct. 2012, now U.S. Pat. No. 8,733,269, which is a continuation of U.S. patent application Ser. No. 13/321,798, filed 21 Nov. 2011 (issued as U.S. Pat. No. 8,322,298 on 4 Dec. 2012 and published as No. US2012/0060745 on 15 Mar. 2012), which is a U.S. National Stage Entry Application of PCT International Application No. PCT/US2010/045914, filed 18 Aug. 2010 (published as No. WO2011/022496, on 24 Feb. 2011), which claims priority of U.S. Provisional Patent Application No. 61/370,739, filed 4 Aug. 2010, and U.S. Provisional Patent Application No. 61/235,204, filed 19 Aug. 2009, each of which is hereby incorporated herein by reference and priority of each of which is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to valves and valve wear, particularly valve nut wear for a valve having a valve stem and a valve stem nut that moves the valve stem responsive to a rotation of the valve stem nut. More particularly, the present invention relates to a method and apparatus for detecting valve stem nut wear for any valve that has a valve stem operated by rotation of a valve stem nut and wherein this apparatus is not an as-manufactured part of the valve to be inspected.

2. General Background of the Invention

A motor operated valve or "MOV" apparatus can employ a rising stem. This rising stem is operated by a rotating stem nut. One of the problems that plagues users of such valves (e.g. chemical plants, nuclear plants and other such facilities) is the failure of the stem nut after it has been in service for a long time.

A motor operated valve stem nut is typically made of a softer material (such as a bronze alloyed material) than the material used to make the stem (usually steel). Over a period of time, the stem nut threads will wear when opening and closing the valve. The wear can be influenced by several factors. These factors can include the stem nut material, normal operating loads, and maximum loads as examples. The wear can also be influenced by the number of stem nut rotations that occur during the valve stroke. Another factor that influences wear is the number and frequency of valve strokes. Yet other features that contribute to wear include stem nut manufacture and threaded length, stem-to-stem-nut fit, valve stem thread nut condition, and stem lubricant. Other factors include the lubrication method and frequency as well as environmental conditions for the lubricant.

Since the valve stem is typically made of a harder material such as stainless steel or carbon steel, it is typical and expected that all thread wear will occur on the valve stem nut threads and not on the valve stem. This is preferential to having wear occur on the valve stem (as the stem nut is typically much easier to change out than the valve stem).

On rising stem valves, a stem nut transfers rotational motion (torque) of a motor operated or manual valve to axial stem movement or "thrust". Stem nut failure will prevent valve operation and may cause valve position indication to be incorrectly displayed in a control room. If the motor operated valve is electrically interlocked, its failure can also interfere with the operation of other plant equipment resulting in a potentially costly or catastrophic failure event.

Unfortunately, many facilities, plants, chemical refineries and the like do not take a proactive approach to maintaining these valve stem nuts. One reason that these facilities do not take a proactive approach is that it is difficult to predict failure of any particular valve. In some cases, a failure may take many years to occur.

Another problem with a proactive approach to maintaining valve stem nuts is that direct inspection of the stem nut threads is intrusive and requires taking the valve out of service to remove and inspect.

On smaller diameter stems, measuring the stem nut thread wear on a removed stem nut can be very difficult. There is limited space inside the stem nut to get a direct measurement with dial calipers.

Excessive stem nut thread wear represents a potential common cause failure mode that could impact all rising stem valves. The unexpected failure of valve stem nuts, and resulting consequence emphasizes the importance of improving conditions, monitoring maintenance practice activities, and identifying, quantifying and minimizing stem nut thread wear. Periodic stem nut removal and inspection or measuring thread backlash may be beneficial to prevent failure. It is important for any maintenance program to detail proper stem cleaning and lubrication procedures.

The valves to be tested are not always gate valves, but any valve using a threaded stem and nut.

An assumption is that the stem is cut properly (which is not always the case)—thus, as part of the method, it is preferable to also measure stem threads to make sure that the assumption is correct.

At some facilities, the stems tend to corrode instead of wearing.

The tool of the present invention was validated in lab tests, where it appears that the tool can predict wear with 3-11% accuracy.

Typically, stems are made of hardened steel, but some facilities use 17-4 PH stainless steel for replacement stems.

The stem nuts can be aluminum bronze (softer), but some are manganese bronze (harder).

Some stem nuts may be as hard as the stems (that is not desirable, as the stems may wear as fast as the nuts, and they are more difficult to replace).

The stems at some facilities are 29 degree Acme thread with double leads.

The following table lists possibly relevant patents and applications, the order of listing being chronological, the order of listing otherwise having no significance.

TABLE

| PATENT/PUB. NO. | TITLE | ISSUE/PUB. DATE (MM-DD-YYYY) |
|---|---|---|
| 3,721,133 | Anti-backlash Screw Jack | Mar. 20, 1973 |
| 3,857,547 | Automatically Compensating Jack Construction | Dec. 31, 1974 |
| JP 04296268 | Valve Actuator Provided with Automatic Detecting Means for Stem Nut Wear | Oct. 20, 1992 |
| 5,224,512 | Valve stem driving apparatus | Jul. 6, 1993 |
| 5,487,302 | Method and system for measuring gate valve clearances and seating force | Jan. 30, 1996 |
| 5,620,166 | Stem and nut with bearing for use in a motor operated valve | Apr. 15, 1997 |
| 2002/0095986 | Method and apparatus for diagnosing abnormality and estimating degradation in valve apparatus | Jul. 25, 2002 |
| 6,799,928 | Device for detecting wear of a nut in a screw-and-nut assembly | Oct. 5, 2004 |
| 7,549,440 | Valve position indicator for buried valves | Jun. 23, 2009 |

GENERAL DISCUSSION OF THE PRESENT INVENTION

The stem nut analysis protractor tool of the present invention was developed to provide a non-intrusive and quick means of quantifying stem nut thread wear without having to remove the valve from service. This process measures the backlash between the stem and stem nut threads on rising stem valves. Using the apparatus and method of the present invention, it is possible to quantify the remaining stem nut thread metal.

Generally speaking, nonintrusive stem nut wear detection can find its roots in nuclear plant "MOV" diagnostics. "MOV" diagnostics are required by the Nuclear Regulatory Commission as necessary to prove operability of valves needed to safely shut down a nuclear plant during an emergency event. As early as the mid 1990's, the backlash "zero" region in the stem thrust/time trace could provide an indication that excessive stem nut wear existed.

The apparatus of the present invention can be used to measure the same area but uses a much less complicated process to perform.

The stem nut area of interest is identified as $X = P - F_{cs}$ (base of the stem nut thread indicated by arrow X) in FIG. 7A where P is the thread pitch and $F_{cs}$ is the basic flat at crest of the stem thread (Reference: Machinery's Handbook 25 General Purpose Acme Threads pp 1716-1724). The formulas:

$$X = P - F_{cs}$$

$$F_{cs} = 0.3707 * P - 0.259 * P.D. \text{ (where P.D. Allowance on External Thread} = (0.008 * sqrt(D)))$$

Lead=Inches of Axial Stem Movement Per 360° Revolution

Inches Per Degree=Lead/360

100% Stem Nut Thread Inches*Inches Per Degree=100% Wear in Degrees were used to calculate $P-F_{cs}$ then convert it to its rotational percentage of backlash and is valid for all General Purpose Acme Threads with one, two, three, or four thread starts. The linear relationship between stem nut rotation and stem axial movement can be found in the definition of "Stem Lead"—the distance a stem thread advances axially in one turn of the stem nut. X ($P-F_{cs}$) equals 100% of the thickest part of the stem nut thread; this is where the backlash is measured. As the stem nut thread wears, its backlash will increase, allowing more free rotation. The purpose of the method and apparatus of the present invention is to measure thread wear percent or "backlash percent" (see FIG. 4). Once the backlash percent is measured, remaining thread material can be calculated to provide the basis to determine valve operability. The data collected can be used to determine thread structural integrity, and ultimately, to predict its functional-failure point to preempt failure by monitoring stem nut life cycle and wear rate (see FIG. 7C).

In an example of the method of the present invention, it is assumed that the valve stem threads are properly manufactured with a 29 degree angle to the dimensions detailed in the Machinery's Handbook 25 for ACME Thread Design.
Protractor Development:

"Lead", defined as the distance a stem travels axially with one stem nut rotation, is the basis for using the protractor for measuring stem nut wear.

Example: Using the formula for lead, a 1.5" (3.8 cm) Diameter stem with a ¼Pitch and ½ Lead will result in 0.500" (1.27 cm) of axial stem movement for one rotation of the drive stem nut. 0.500"/360°=0.0013888 in/deg. (1.27 cm/360°=0.0035277 cm/deg.)

If "$P-F_{cs}$" of this thread equals 0.1548" (0.3932 cm) and is 100% of the stem nut thread then 0.1548"/0.0013888 in/deg.=111.46° (0.3932 cm/0.0035277 cm/deg.=111.46°)

To find percent wear per degree measured; 100%/111.46°=0.8971576%/deg. Confirmation that this protractor scale can be used on other two thread-start stems can be found below:

3.0" (7.6 cm) Diameter stem with ⅖ Pitch and ⅘ lead with 0.800" (2.032 cm) per rotation;

0.800"/360°=0.0022222 in/deg. (2.032 cm/360°=0.0056444 cm/deg);

0.248131" (100% thread width)/0.0022222 in/deg.=111.66° (0.630253 cm (100% thread width)/0.0056444 cm/deg.=111.66°);

100%/111.66°=0.8955753%/deg.

Assuming that the stem threads are cut accurately, measuring percent wear is substantially equal to the stem nut thread wear. This measurement can be used for a variety of Acme thread starts, pitch and lead. Examples are for double thread start general purpose (G.P.) Acme thread stems.
Calculations for Different Acme Thread Options The following formulae variables are identified as follows (Reference: Machinery's Handbook 25 General Purpose Acme Threads pp 1716-1724):

P=Stem Thread Pitch
$F_{cs}$=Basic Flat at Stem Thread Crest (FIG. 7A)
D=Stem Thread Diameter
L=Stem Thread Lead
Total Degrees for 100% Wear=$(P-F_{cs})/(L/360°)$
Where:
$F_{cs}$=(0.3707*P−0.259*(0.008 √D)) for General Purpose Acme
$F_{cs}$=(0.4224*P−0.259*(0.008 √D)) for Stub Acme
Each of the below 100% wear calculations used an average of eight common stem diameters and thread configurations (Attachment 6) for general purpose and stub acme threaded stems.

1. General Purpose Acme;
   a. One-Thread Start Degrees in 100% wear; [(P−($F_{cs}$)/L/360° ]
      i. Average calculated degrees per 100% wear)(222.6566°
   b. Two-Thread Start Degrees in 100% wear; [(P−($F_{cs}$)/L/360° ]
      i. Average calculated degrees per 100% wear (111.5301)
   c. Three-Thread Start Degrees in 100% wear; [(P−($F_{cs}$)/L/360° ]
      i. Average calculated degrees per 100% wear)(74.3058°
   d. Four-Thread Start Degrees in 100% wear; [(P−($F_{cs}$)/L/360° ]
      i. Average calculated degrees per 100% wear)(55.6552°
2. Stub Acme;
   a. One-Thread Start Degrees in 100% wear; [(P−($F_{cs}$)/L/360° ]
      i. Average calculated degrees per 100% wear)(204.0446°
   b. Two-Thread Start Degrees in 100% wear; [(P−($F_{cs}$)/L/360° ]
      i. Average calculated degrees per 100% wear)(102.2241°
   c. Three-Thread Start Degrees in 100% wear; [(P−($F_{cs}$)/L/360° ]
      i. Average calculated degrees per 100% wear)(68.1018°
   d. Four-Thread Start Degrees in 100% wear; [(P−($F_{cs}$)/L/360° ]
      i. Average calculated degrees per 100% wear)(51.0022°

The "Average calculated degrees per 100% wear" is divided into readable increments indicating smaller wear percentages. Individual gauges can be manufactured for each of the above thread start types or one protractor could be made with all GP Acme types on one side and Stub Acme types on the other.

Stems with additional thread-starts will require recalculation using above applicable formula and protractor made to measure stem nut thread wear.

In general, installation of the tool of the present invention requires removal of the stem protector and indication rod, if installed, to provide access to the top of the stem and stem nut. The tool should be mounted where it will freely rotate with the stem nut. Cleaning the top of the stem nut may be necessary to facilitate the tool installation. The presence of hardened grease, broken thread material or any other solid contaminant between the threads may mask the true backlash measured by the tool of the present invention; therefore, cleaning the stem may be necessary. The tool of the present invention preferably also contains a dial indicator, or any similar instrument capable of detecting axial stem movement (other devices that could be used to detect axial stem movement/displacement could include, but are not limited to a linear variable differential transformer (LVDT), laser, or switch). A stylus extension may be required to allow the dial indicator to contact the top (when oriented vertically—otherwise, the exposed end) of the closed valve stem. In some instances, the top of the stem may have imperfections that could affect smooth dial indication reading; a smooth circular disk can be placed on top of the stem for the stylus to ride.

When the wear indicator dial is mounted on a tool which rests on the stem nut, the pointer is mounted to anything independent of the stem nut to indicate the backlash rotation percent on the tool. When the stem does not rise vertically when actuated, then preferably the pointer and dial indicator are mounted on a post which is connected to the stem nut, and the wear indication protractor is preferably mounted on some portion of the valve which does not rotate as the valve stem nut rotates.

BRIEF DESCRIPTION OF THE SEVERAL VIEWS OF THE DRAWINGS

For a further understanding of the nature, objects, and advantages of the present invention, reference should be made to the following detailed description, read in conjunction with the following drawings, wherein like reference numerals denote like elements and wherein:

FIG. 6C is a sectional elevation view of a preferred embodiment of the apparatus of the present invention;

FIG. 6D is a sectional elevation view of a preferred embodiment of the apparatus of the present invention;

FIG. 8A is an exploded perspective view of a preferred embodiment of the apparatus of the present invention;

FIG. 8B shows a detail of a preferred embodiment of the apparatus of the present invention;

FIGS. 16A-16D are perspective views illustrating adapter portions of a preferred embodiment of the apparatus of the present invention;

FIGS. 17-32 are fragmentary perspective views illustrating a method of the present invention;

DETAILED DESCRIPTION OF THE INVENTION

FIGS. 1-2, 6-6D, 8A-10, 16A-25, 27-30, and 33-35 show preferred embodiments of the apparatus of the present invention, designated generally by the numeral 10 or 210.

Figure 5:
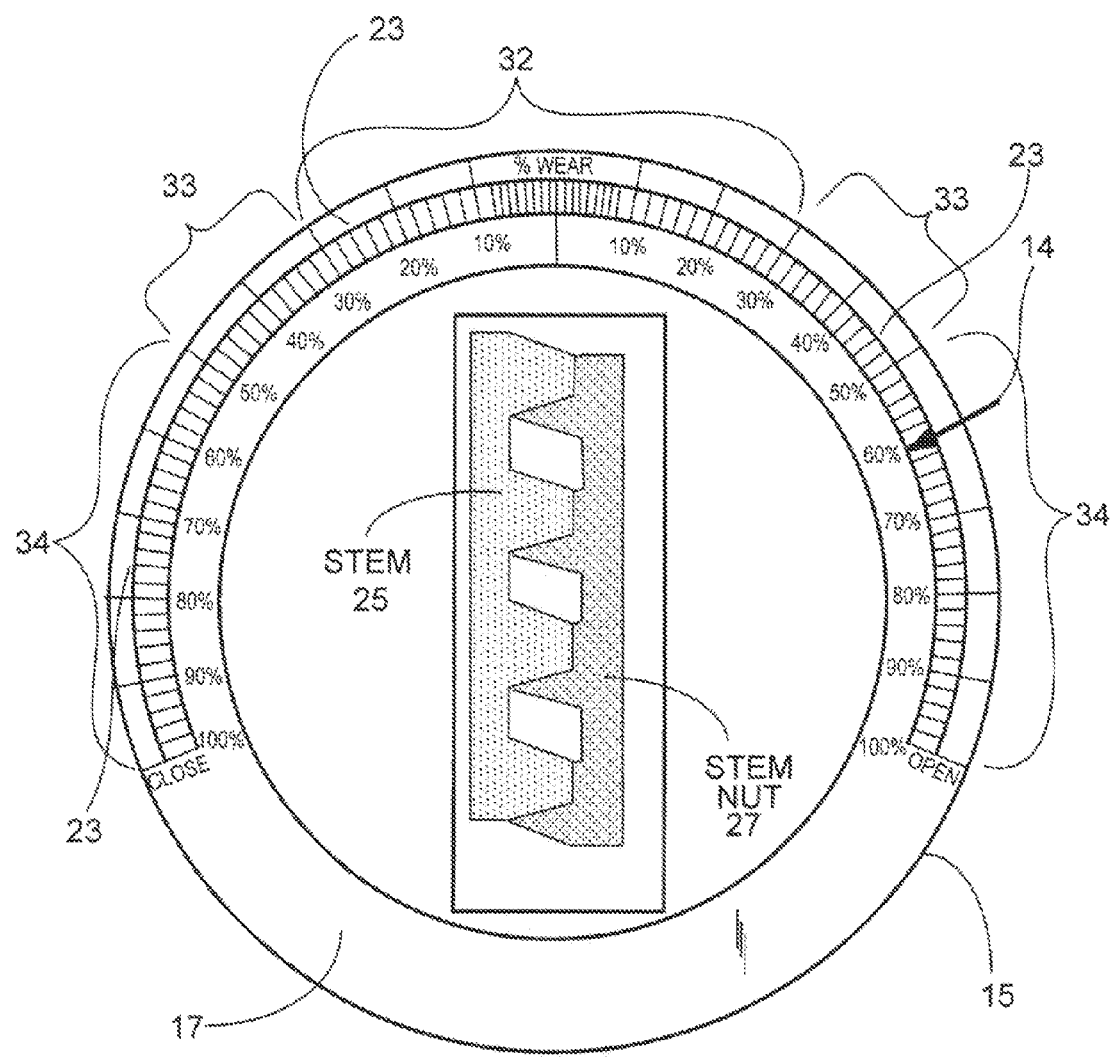
FIG. 5 is a schematic diagram that illustrates a method and apparatus of the present invention.
Figure 6:
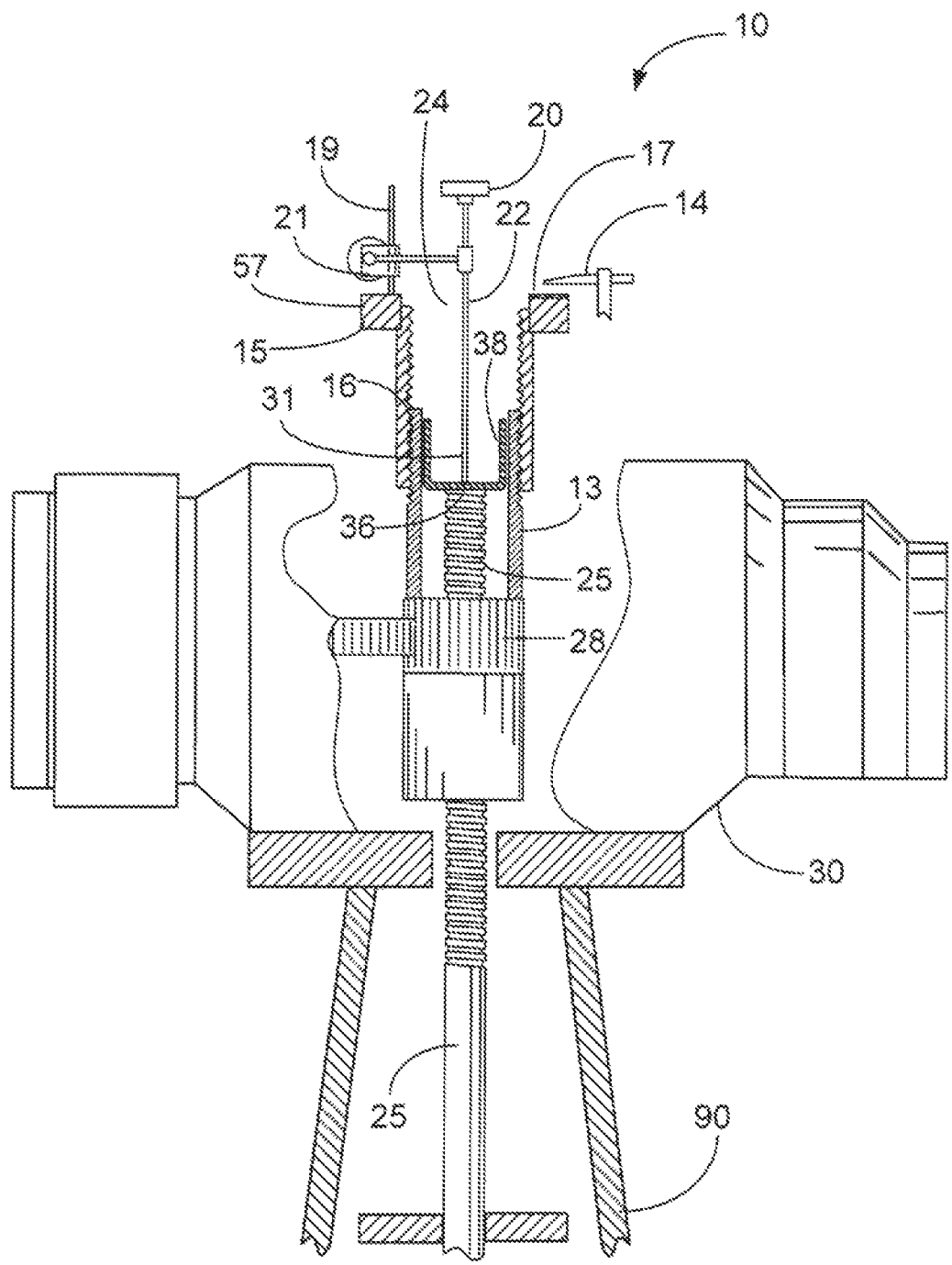
FIG. 6 is a sectional elevation view of a preferred embodiment of the apparatus of the present invention.
Figure 6A:
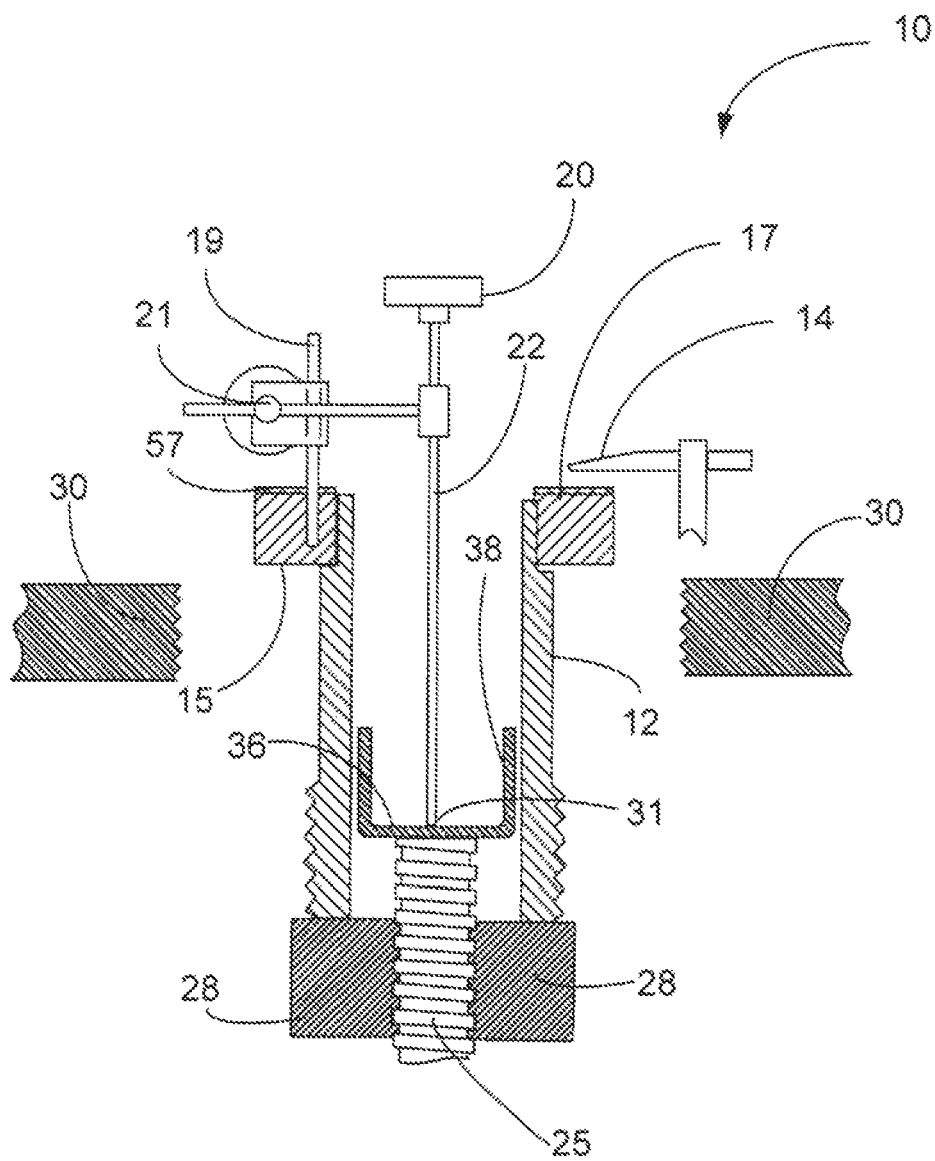
FIG. 6A is a sectional elevation view of a preferred embodiment of the apparatus of the present invention.
Figure 6B:
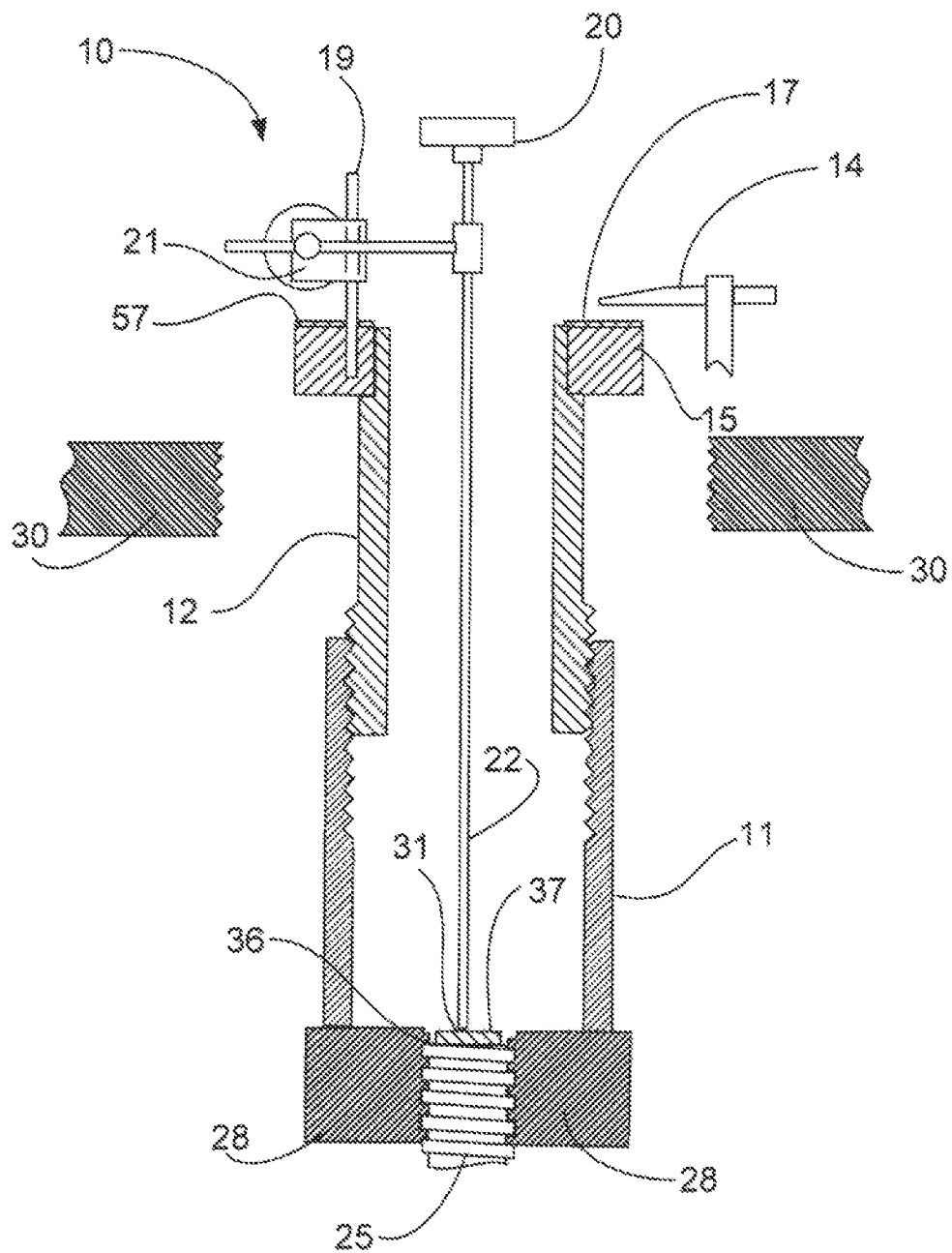
FIG. 6B is a sectional elevation view of a preferred embodiment of the apparatus of the present invention.
Figure 7A:
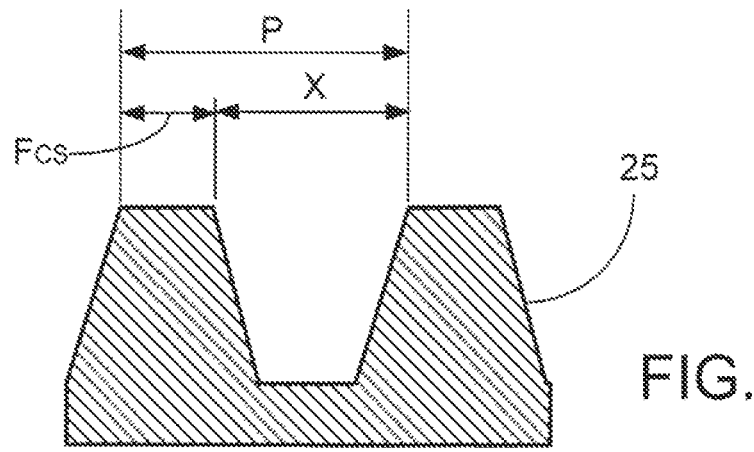
FIGS. 7A-D are schematic diagrams illustrating a method of the present invention.
Figure 7B:
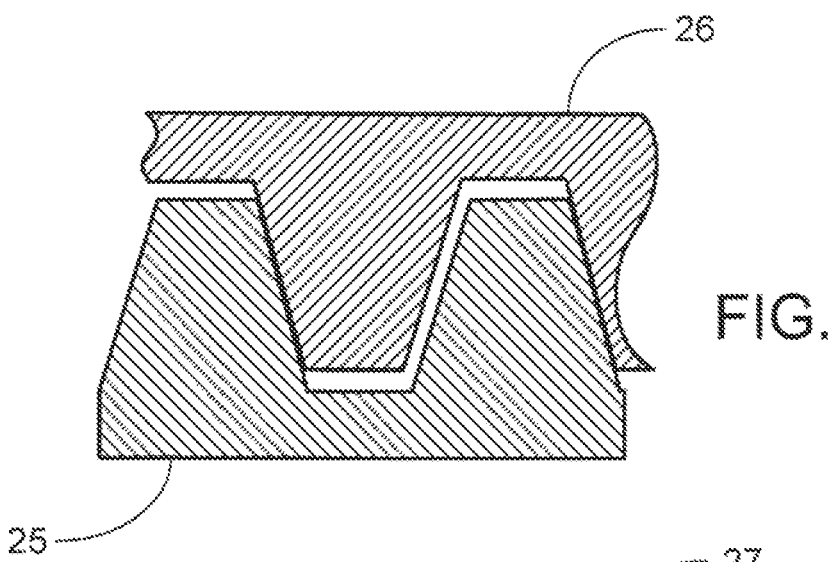
Figure 7C:
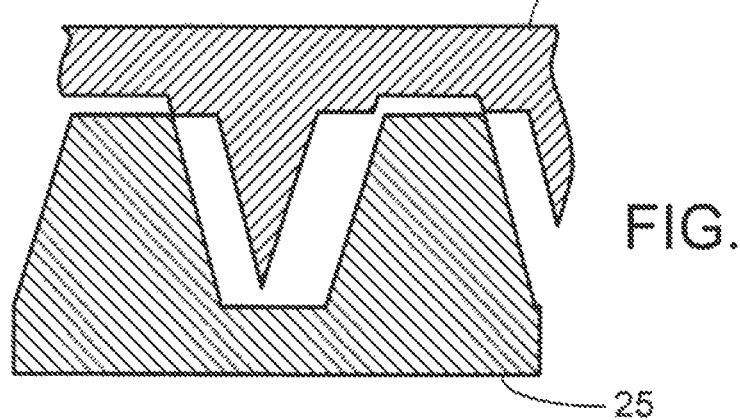
Figure 7D:
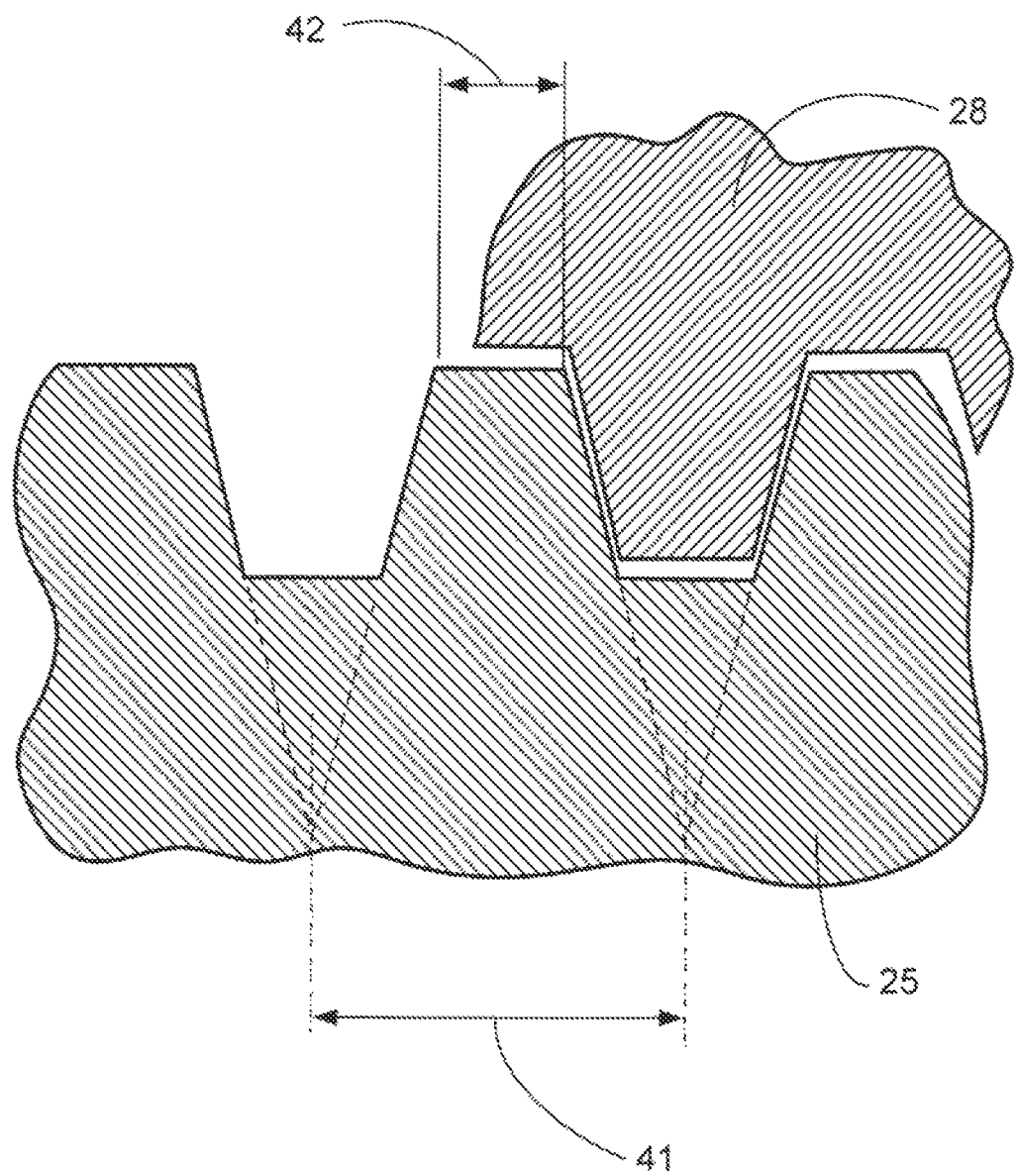

Stem nut analysis protractor apparatus 10 is used to measure valve stem nut wear on any valve 90 having a stem 25 and a stem nut 28 that moves the stem 25 (see FIG. 6). The apparatus 10 of the present invention can be used with any stem 25 diameter (see FIGS. 6, 6A-6D). In FIGS. 8A and 16A-16D adapters are shown as examples of adapters to interface with a valve stem nut 28. These adapters as shown can provide threaded portions (see FIG. 8A) for connecting to one another or tool body 15 so that the apparatus can be placed on the stem nut 26, 27, 28 (see FIGS. 3-6) and have room for the stem 25 to rise therethrough. FIG. 7D shows an exemplary thread configuration (e.g. acme thread) used for a valve stem and stem nut. In FIG. 7D, reference numeral 41 shows the thread pitch while the numeral 42 shows the measurement of a flat at the crest of a thread.

To perform the method of the present invention, the stem protector and indication rod (if installed) are removed. The apparatus 10 preferably includes tool body 15 which is preferably mounted where it will rotate freely with the stem nut 28 (see FIG. 6). The adapters 11, 12, 13 are provided for enabling the tool body 15 to interface with the stem nut 28 depending upon stem diameter. In FIGS. 6B and 8A, the adapter 11 is thus a large adapter for large stems 25. The adapter 12 (FIGS. 6A and 8A) is a medium adapter for medium stems 25. The adapter 13 is a small adapter for use with small stems 25 (see FIGS. 6 and 8A). In FIG. 6B, two adapters 11, 12 are used.

A dial indicator 20 is used to detect axial stem movement in the setup shown in FIGS. 1-2, 6, 6A-6D, 8, 21, 24, 28-30, 33-35. However, any instrument capable of measuring axial stem movement may be used. A stylus extension or rod 22 may be required to allow the dial indicator 20 to contact the top of the closed valve stem 25. In some instances, the top 36 of the stem 25 may have imperfections that could affect smooth dial indication readings. A smooth circular disk 37, or even an upside-down pipe cap 38, for example, can be placed onto the top 36 of the stem 25 for the bottom 31 of stylus 22 to ride upon (see FIGS. 6, 6A-6D).

Figure 3:
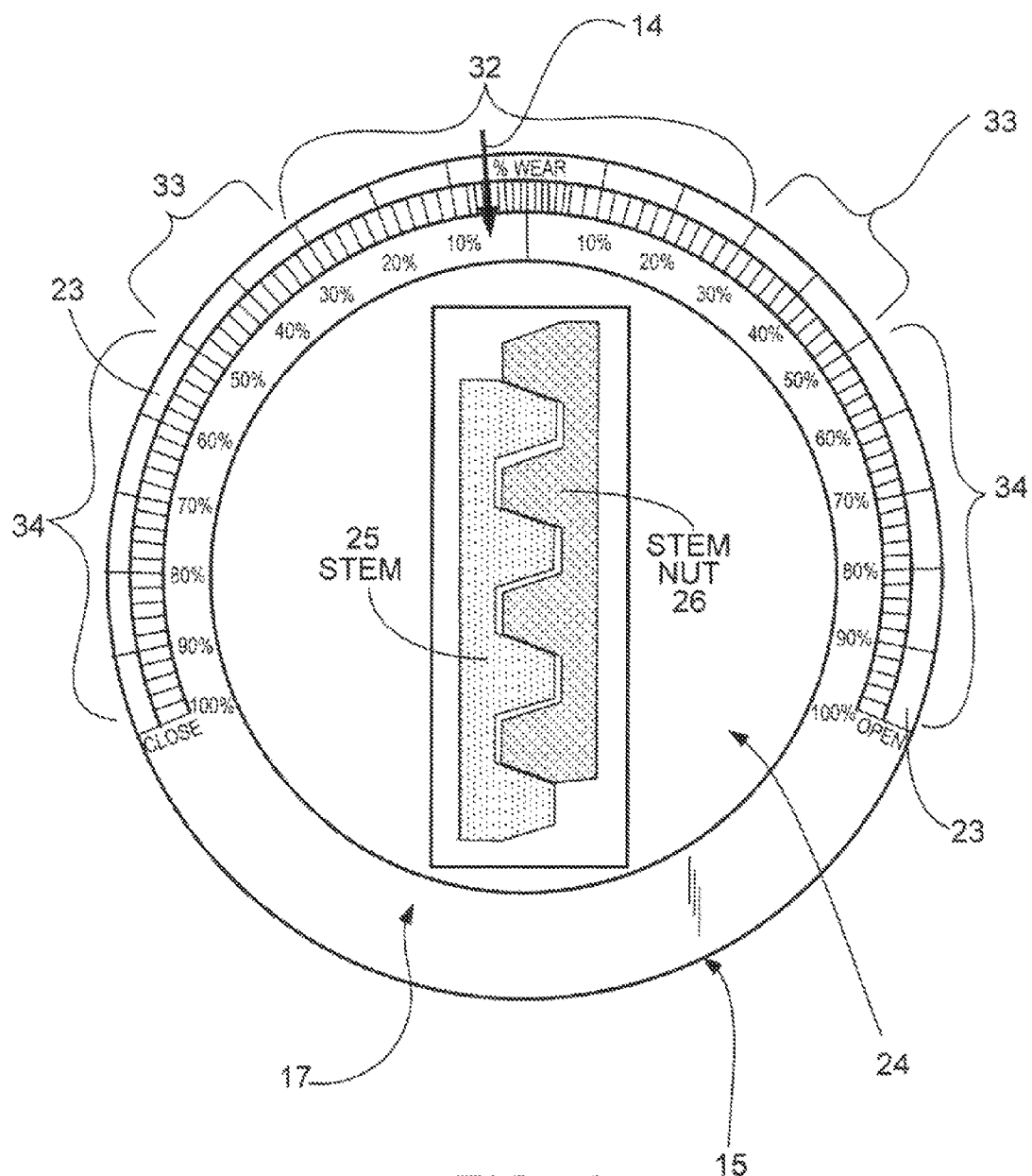
FIG. 3 is a schematic diagram that illustrates a method and apparatus of the present invention.
Figure 4:
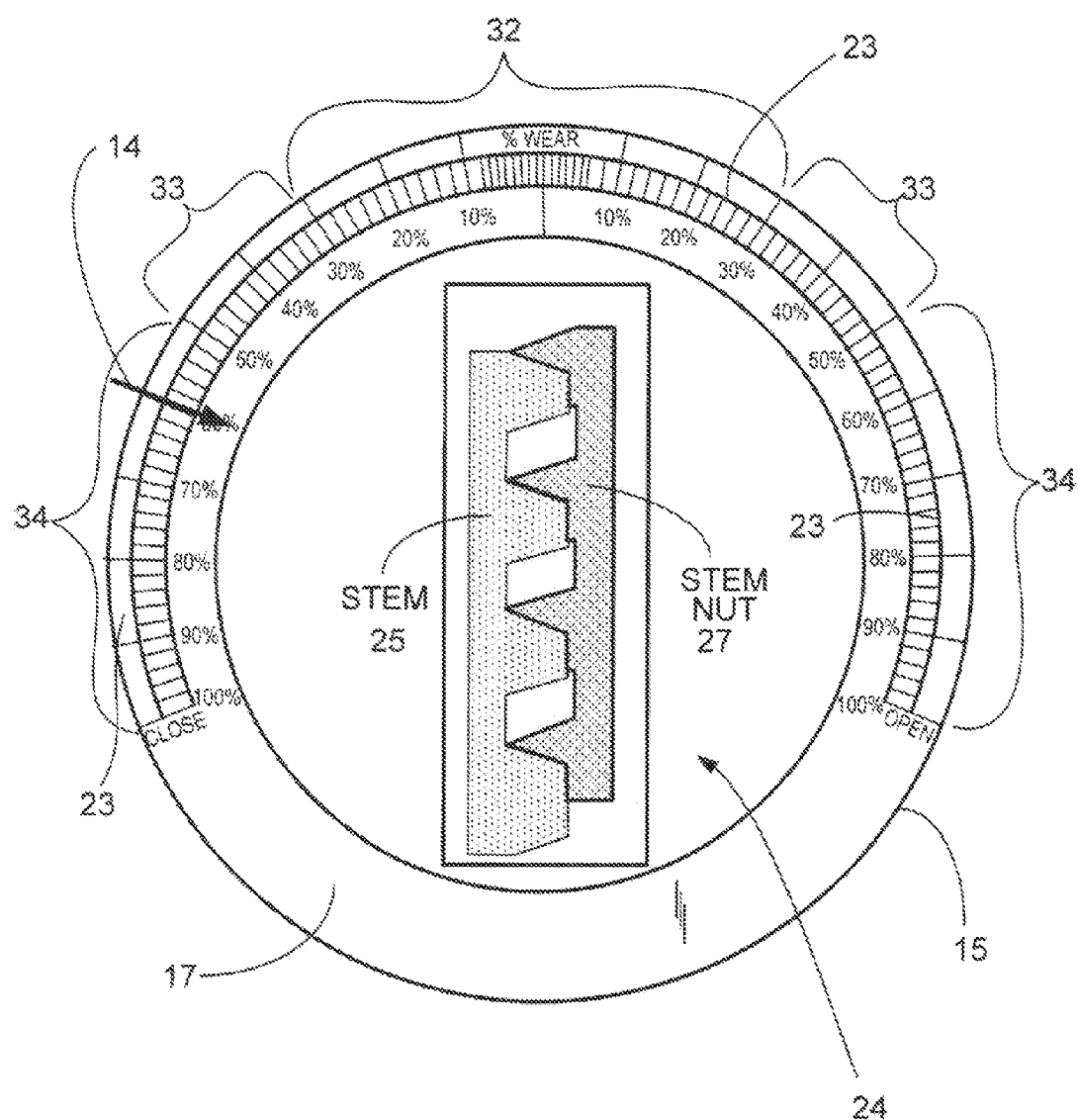
FIG. 4 is a schematic diagram that illustrates a method and apparatus of the present invention.

Pointer 14 is a stationary pointer which indicates backlash rotation as a percent. The pointer 14 should be mounted on any structure that is independent of valve stem nut 28 rotation (see FIGS. 6, 6A-6D). FIGS. 3 and 7B show an example of valve stem nut wear for a new stem nut 26, the wear being a small value of six percent (6%) in FIG. 3. In FIGS. 4-5, the stem nut wear is about sixty percent (60%) or sixty percent backlash which indicates a very worn stem nut 27 that may be in need of replacement (see FIG. 7C for worn configuration of nut 27). Replacement of the stem nut 27 will ultimately be determined by each company's decision process.

Tool body 15 can be generally circular or cylindrical as shown in FIG. 6 and having a central opening 24. The tool body 15 can provide internally and/or externally threaded portions 16 for enabling connection to an adapter 11, 12, 13 or adapters 11-13. While the tool body 15 and adapters 11-13 show threaded portions, other connections could be employed (see FIGS. 16A-16D, for example).

Tool body 15 has an upper face 17 with indicia 23 thereon (a scale) to indicate wear, such as a percentage of stem nut wear between 0 and 100 percent (see FIGS. 2-5, 8). Color coding can be used to indicate acceptable wear (such as green color code 32 (0-30% in FIGS. 2-5 and 8B)), caution zone of wear (such as yellow color code 33 (30-50% in FIGS. 2-5 and 8B)), and unacceptable wear (such as red color code 34 (50-100% in FIGS. 2-5 and 8B)). Indicia or scale 23 can indicate an amount of stem nut wear as a percentage wear value (see FIGS. 2-5, 8B).

Post 19 is supported by tool body 15. Post 19 supports dial indicator 20 which can be any instrument that indicates axial stem movement. Post 19 can have a laterally extending bracket 21 that supports dial indicator 20 and stylus or rod 22. Dial indicator 20 can provide a pointer or arrow 29 indicating a value for axial stem movement (see FIG. 8A).

Installation of the apparatus 10 of the present invention requires removal of the stem protector and indication rod, if installed, to provide access to the top of the stem and stem nut. It should be mounted where it will freely rotate with the stem nut 28. Cleaning the valve stem 25 and the top of the stem nut may be desirable to facilitate the tool 10 installation. The apparatus 10 contains a dial indicator 20, or any similar instrument capable of detecting axial stem movement. A 90° dial indicator (not shown, but it could for example be a Starrett brand 90° dial indicator) can be used in situations where a visual line of sight is not convenient from the top of stem 25 (looking vertically downward)—i.e. reading would be taken from the side of the actuator/tool assembly instead of from the top of everything. This 90° dial indicator could be installed onto holding clamp 21. The stylus extension 22 (see FIG. 1) may be required to allow the dial indicator 20 to contact the top 36 of the valve stem 25. In some instances, the top 36 of the stem may have imperfections that could affect smooth dial indication reading; a smooth circular disk 37 (see FIG. 6B) or an inverted pipe cap 38 (see FIGS. 6, 6A, 6C 6D) can be placed on top of the stem 25 for the stylus 22 to ride upon. A pointer 14 should be mounted to anything independent of the stem nut 28 to indicate the backlash rotation percent on the apparatus 10 (see FIG. 2).

FIG. 3 represents a new stem nut 26 with 6% backlash. FIG. 4 represents a worn stem nut 27 with 60% backlash when closing the valve. FIG. 5 represents a worn stem nut 27 with 60% backlash when opening the valve. While typically there will be about even wear on the stem nut 27 from opening and closing the valve (see FIG. 7C), the wear can be uneven as shown in FIGS. 4 and 5. There might be more wear when opening the valve in situations where breakaway torque and stem thrust of the valve is excessive, high stem seal packing force is encountered, or upper open limits are set on a high torque value, and there might be more wear when closing the valve in situations where closing torque and stem thrust of the valve are excessive or high stem seal packing force is encountered, or closing limits are set on a high torque value.

In FIGS. 1-2, 6, 6A-6D, the apparatus 10 sits atop the stem nut 28, and rotates therewith as the stem nut 28 is rotated. The larger diameter dial or scale 23 indicates the rotation of the stem nut 28 until the dial indicator needle 29 moves, indicating that the stem 25 is moving. At this point, one reads where the pointer 14 is in relation to the large diameter dial 23 to find out how much wear has occurred on the stem nut 28 threads.

Effective operation of the system of the present invention requires minimal training; however, having a basic mechanical understanding of valve designs would help the technician 40 modify his technique to successfully perform the test. Certain dynamics that could make backlash measuring difficult are:
1. Loose stem nut locknut or broken stem anti-rotation device—these conditions may mask the true backlash amount.
2. System pressure—depending on valve design and packing loads, system pressure could make it difficult to find the backlash area due to the stem ejection effect (see discussion below of FIGS. 6C and 6D).
3. Stem Orientation—when the valve stem is oriented vertical up, gravity can hold the wear measurement protractor in place. With any other orientation the tool is preferably connected directly to the stem nut either by adhesive or mechanical means.
4. Thread Contamination—The presence of hardened grease, broken thread material or any other solid contaminant between the threads may mask the true backlash measured by the tool of the present invention.

Figure 26:
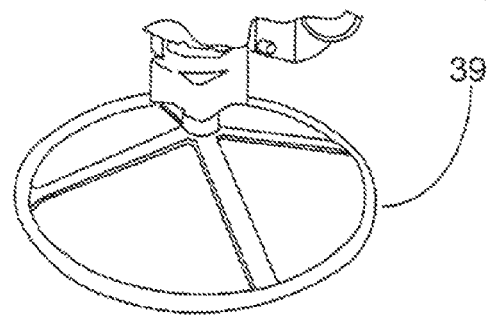
Figure 27:
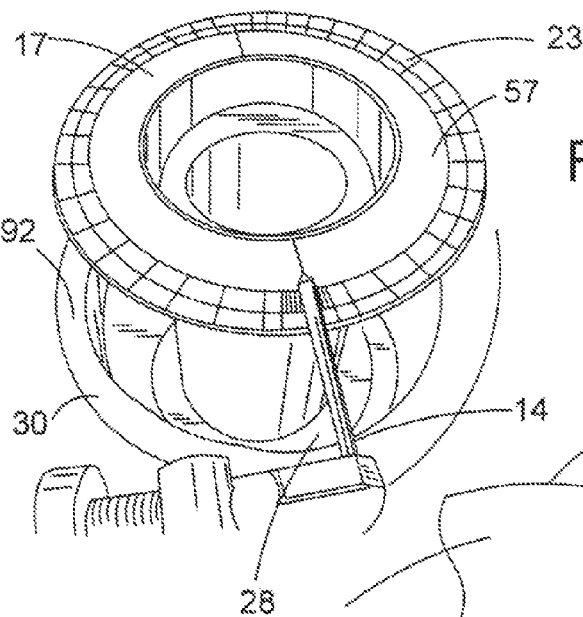
Figure 28:
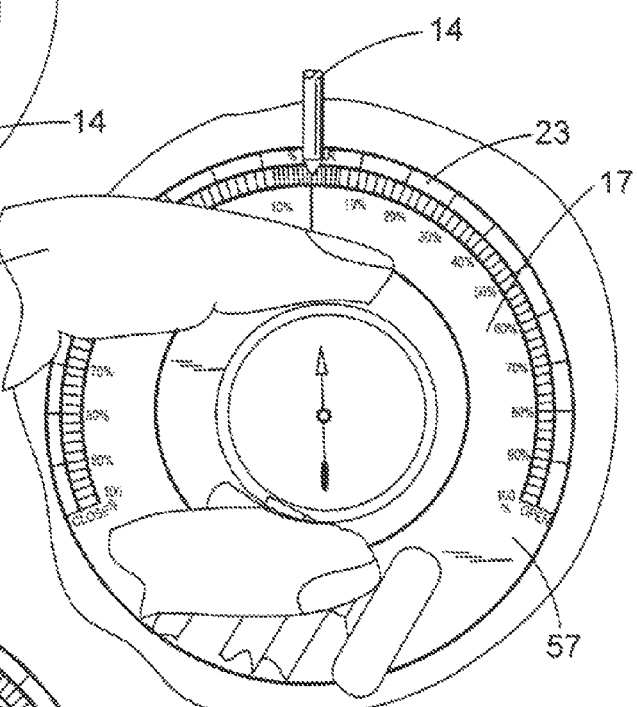
Figure 29:
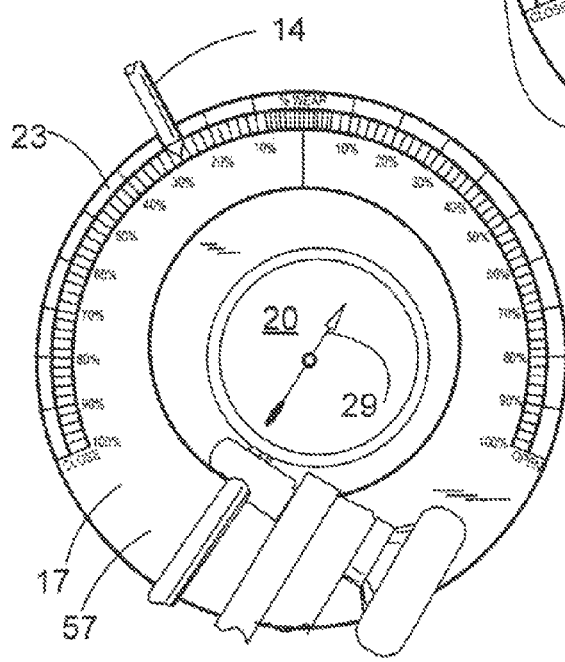
Figure 30:
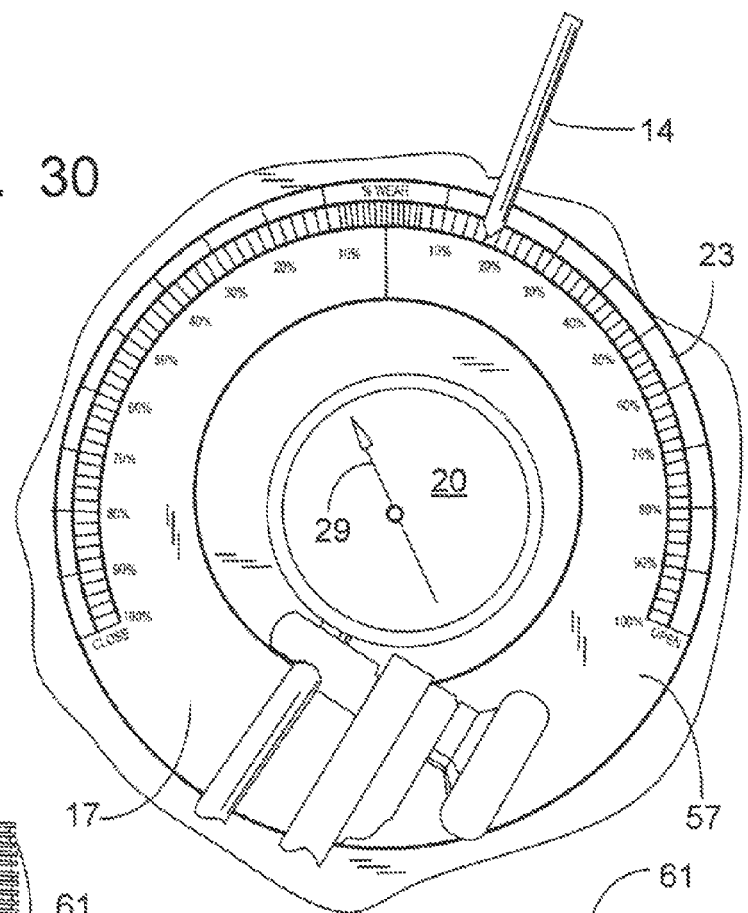
Figure 31:
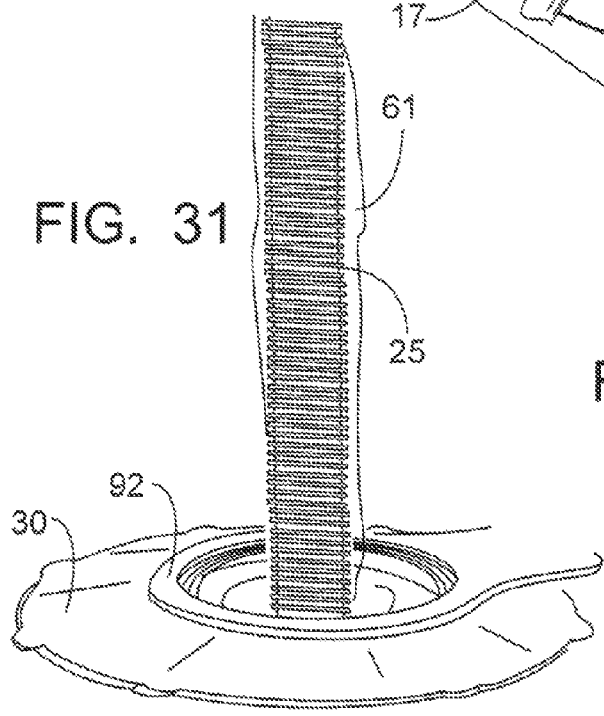
Figure 32:
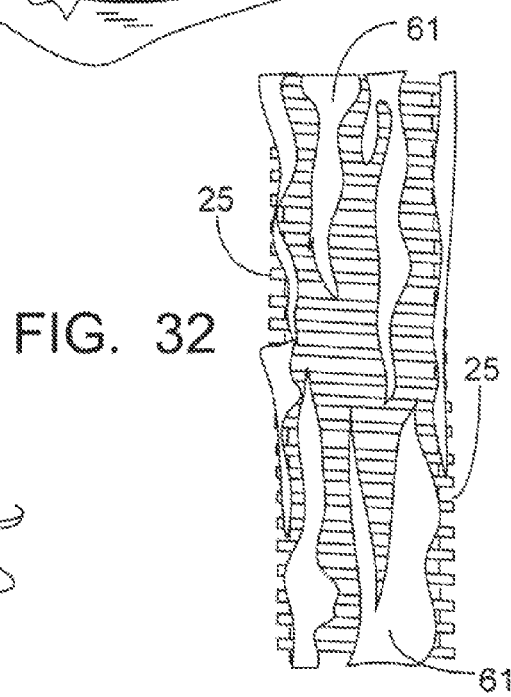

To perform the method of the present invention with apparatus 10, operator 40 would preferably perform the following steps. With the apparatus 10 in place on the stem nut 28 of a closed valve 90, declutch the actuator if necessary, and rotate the handwheel 39 open. The valve actuator usually goes through a lost-motion region as the worm gear advances around the drive sleeve until it contacts lugs on the drive sleeve (defined as hammer blow). The drive sleeve/stem nut 28 will then start turning. At this point, the threads will immediately pass through backlash, or the stem 25 will start rising and soon pass through backlash. While in the backlash region, the stem nut 28 will turn and the stem 25 will not move. Operator 40 continues turning wheel 39 until the stem nut 28 takes up the backlash and stem movement is detected on the dial indicator. The operator 40 then stops rotation of wheel 39 (see FIG. 26). Operator 40 then rotates the apparatus 10 until the pointer is pointing to a zero reading ("0") (see FIG. 28). The operator 40 slowly rotates the handwheel 39 "closed" until the thread backlash is taken up and stem 25 movement is seen on the dial indicator 20. The operator 40 then stops and records the percent wear indicated on the scale 23 of tool body 15 (see FIG. 29). This procedure can be repeated in the open direction to validate the reading. To eliminate wear of stem 25 as the source of measured backlash, one should place a thread gauge on the stem threads to observe any detectable wear in stem threads.

Empirical data from stem nut threads measured by the apparatus 10 is currently being obtained (see Attachment 1 attached to U.S. Provisional Patent Application No. 61/235,204, filed 19 Aug. 2009, which shows wear percentages from 0 to 82%). Stem nuts determined to have excessive wear (≥40%, for example) can be replaced and have a detailed physical examination of the remaining thread widths performed. Validation of all calculations used to develop the apparatus 10 can also be completed. The initial validation of the formula $X=P-F_{cs}$ on a General Purpose Acme thread with a ½ pitch was calculated at 0.31245 inch (0.79362 cm). Validation of this calculation was done by measuring a 29° 2N Acme Thread Gauge. Continued field validation was performed by recording the percent wear as indicated on the apparatus 10 then removing and cutting the stem nut to measure the thickness of the remaining thread.

FIG. 6A-6D are drawings of various adapters used to interface with a wide range of stem 25 sizes. The tool 10 of the present invention has been successfully used to measure stem nut wear on valve stems diameters ranging from 1.25" to 4.125" (3.175 cm to 10.48 cm) and can be adapted for any other stem sizes. The adapters shown fasten via threaded connection; however, other connection methods could be used as is practical for obtaining accurate data. The tool of the present invention has been used on over 60 valves and twenty have indicated >40% wear and ten have indicated >50% wear.

Figure 9:
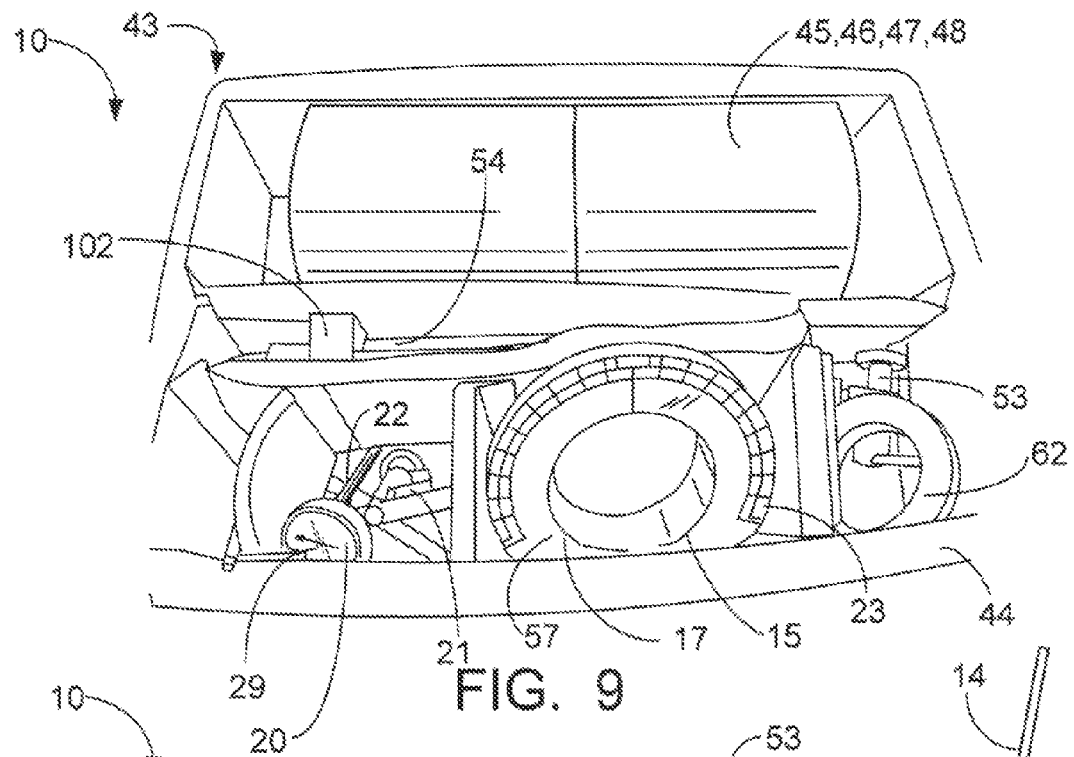
FIG. 9 is a partial perspective view of a preferred embodiment of the apparatus of the present invention.
Figure 10:
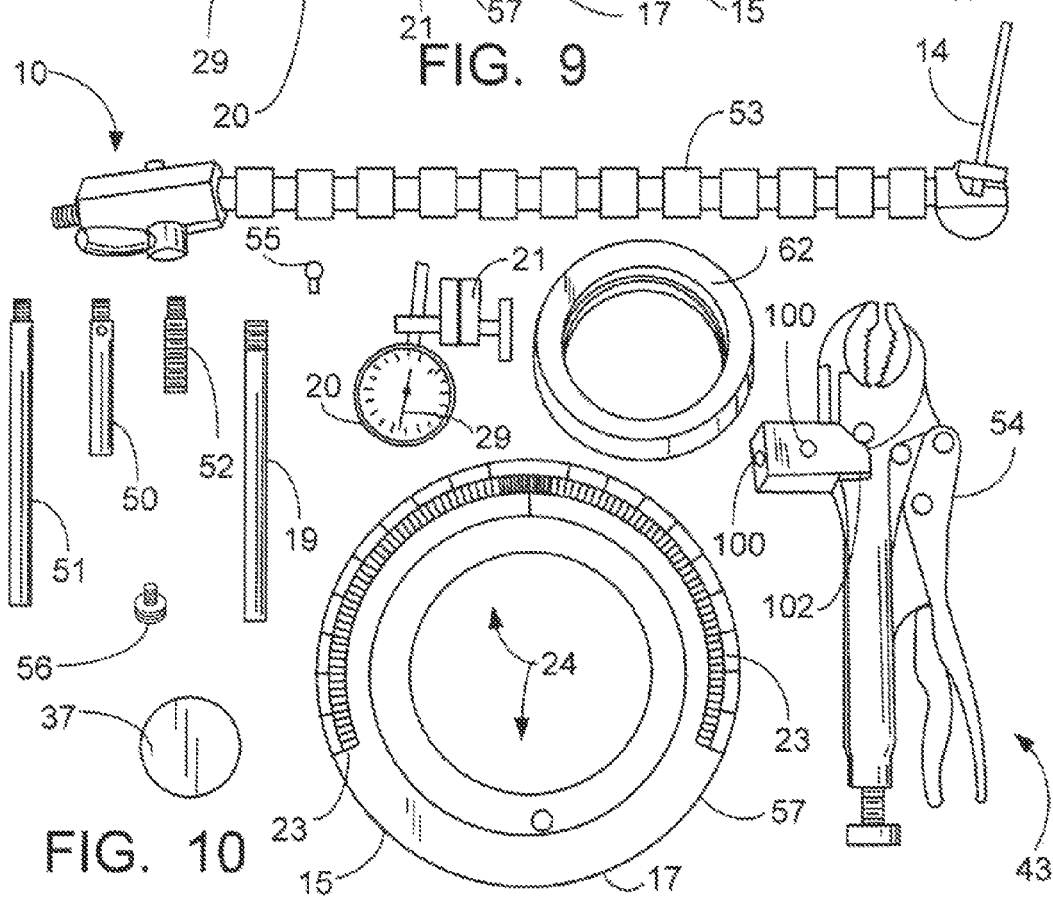
FIG. 10 is a plan perspective view of a preferred embodiment of the apparatus of the present invention.
Figure 11:
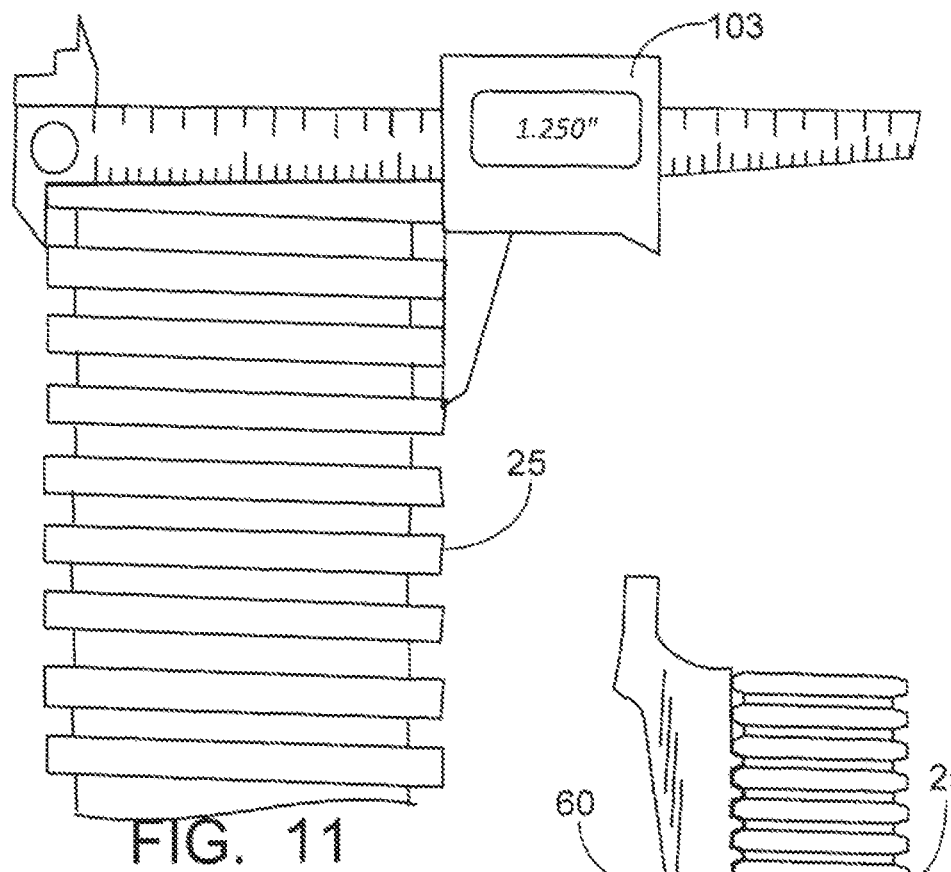
FIGS. 11-13 are schematic diagrams illustrating a method of the present invention.
Figure 12:
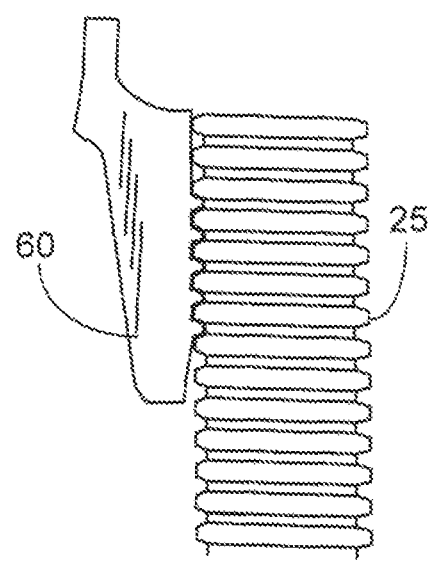
Figure 13:
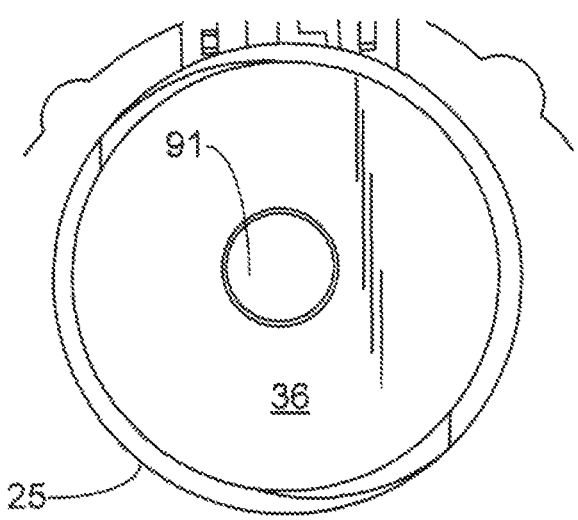
Figure 14:
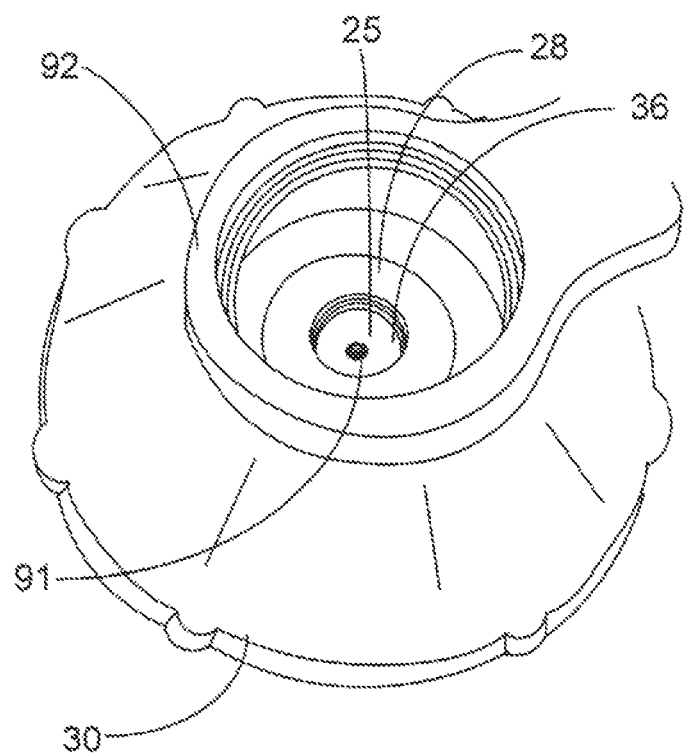
FIGS. 14 and 15 are fragmentary perspective views that illustrate a method of the present invention.
Figure 15:
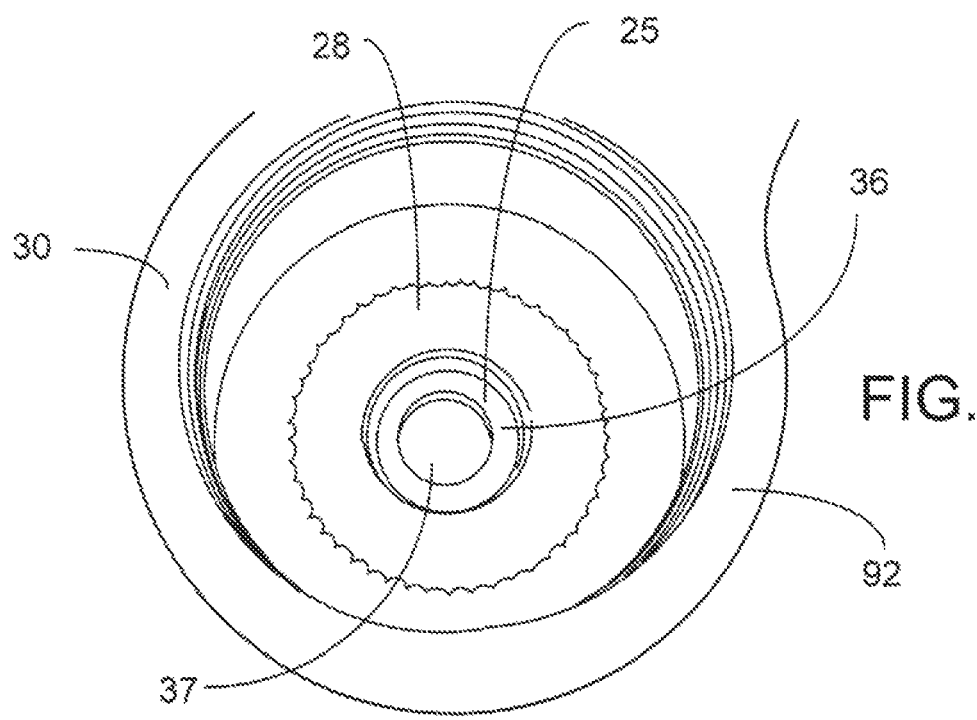
Figure 19:
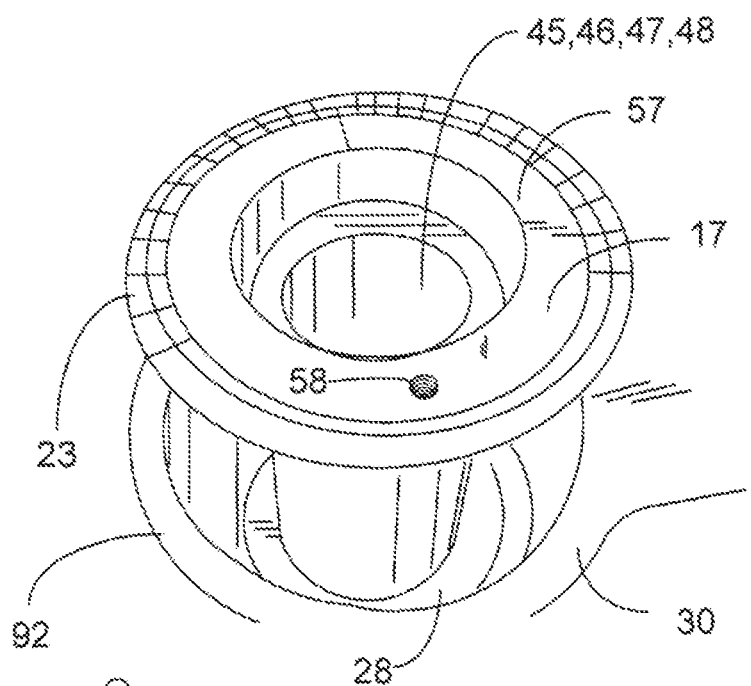
Figure 20:
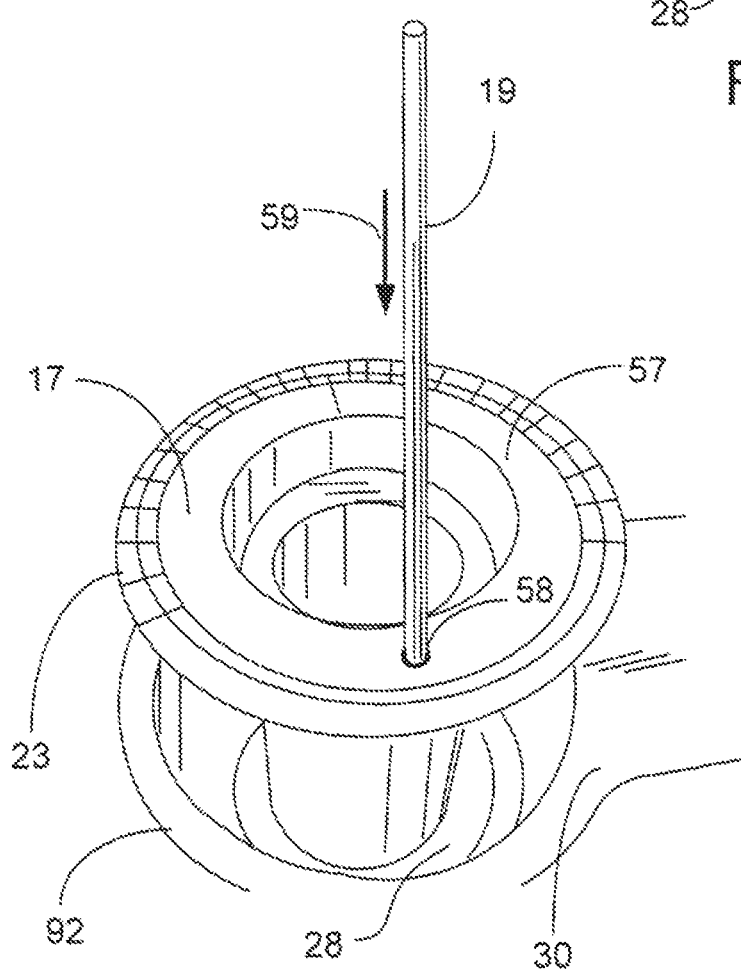
Figure 24:
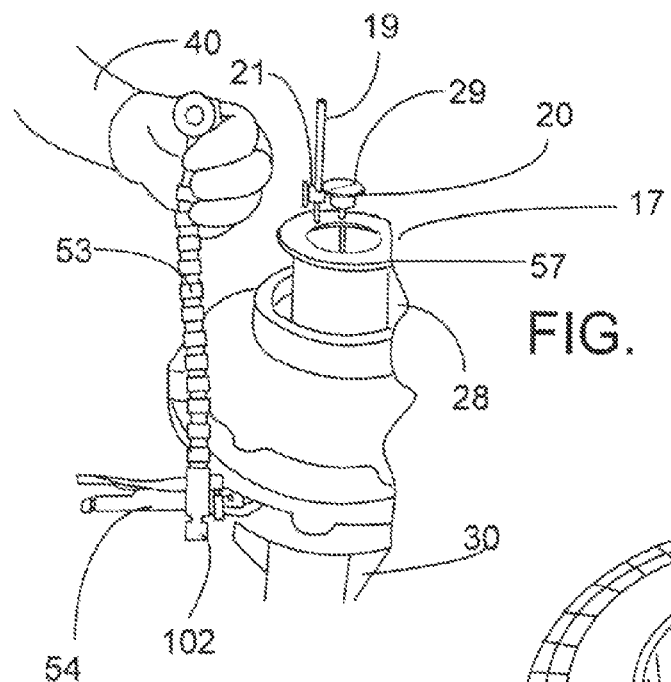
Figure 25:
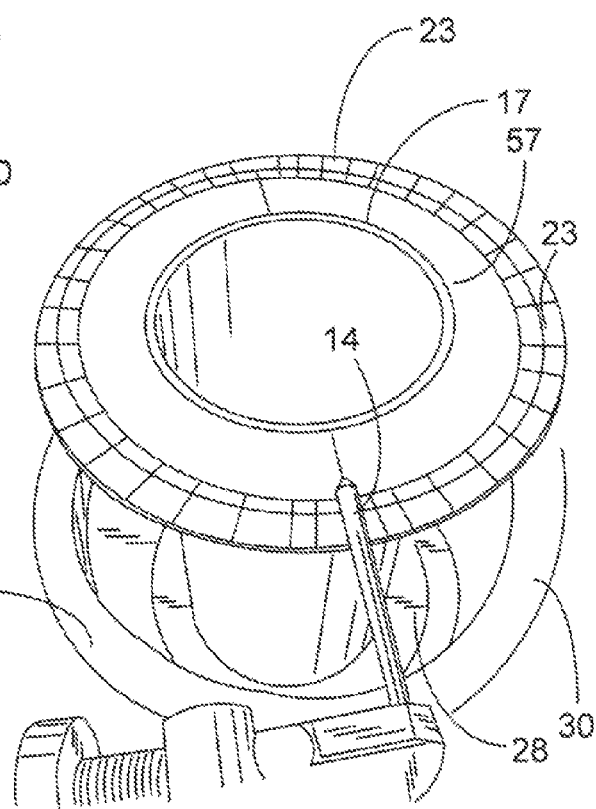

In FIGS. 9 and 10, a kit 43 is shown that could be carried into the field for testing stem nut wear. The kit could include a suitable container or case 44. Kit 43 could contain any of the above discussed components such as tool body 15, adapters 11, 12, 13, 45, 46, 47, 48, and/or post 19, disk 37 and/or cup 38, post extensions 50, 51, 52, flexible holder 53 and clamp/grip/wrench 54. Clamp/grip/wrench 54 has a mounting assembly 102 used to secure flexible holder 53.

Figure 35:
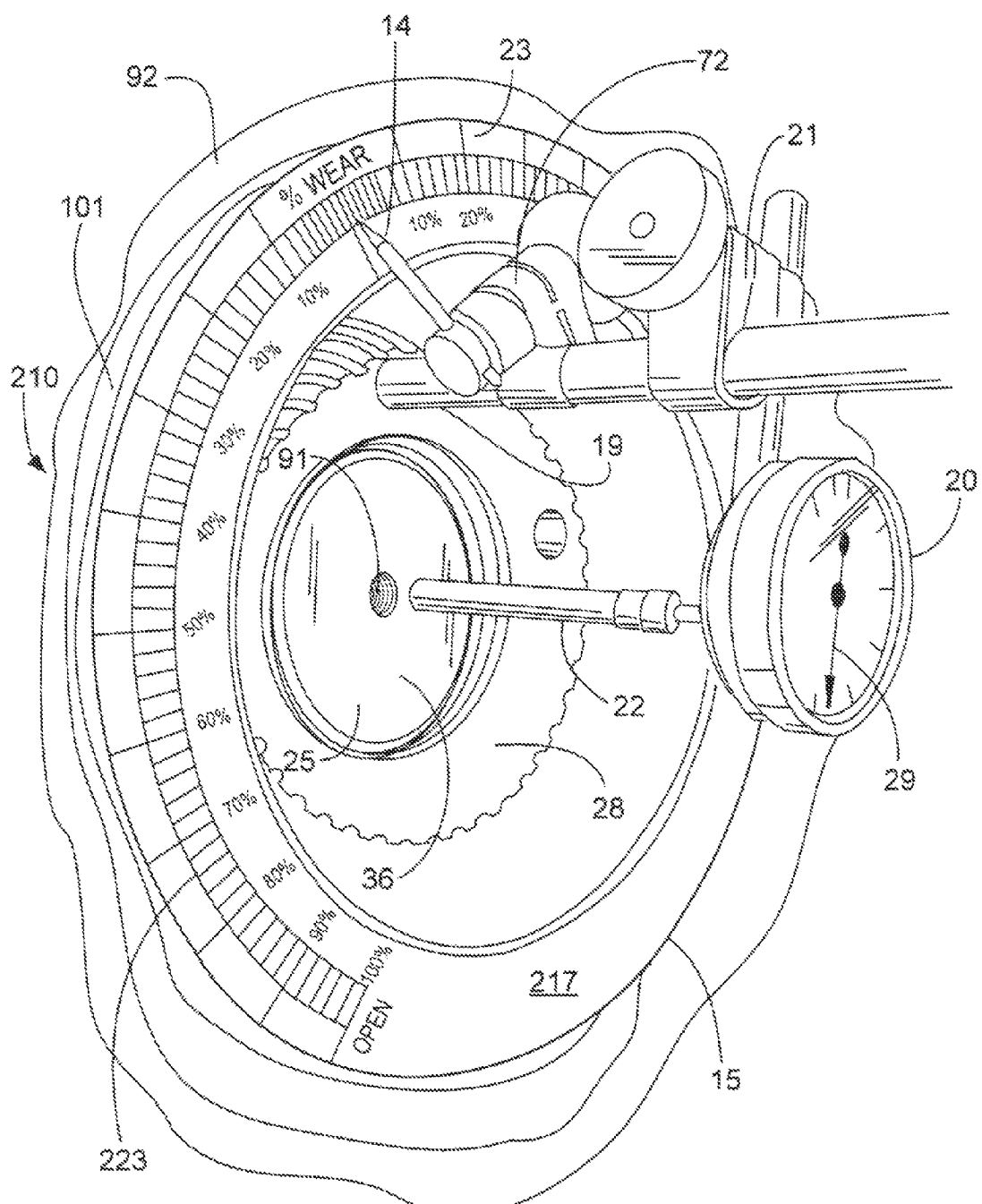
FIG. 35 shows another embodiment of the apparatus of the present invention mounted on a valve, for use with valves whose stems do not rise vertically when actuated.

As an alternate, a post 19 could be directly affixed to the stem nut 28 (see FIG. 35). Stem nut analysis protractor apparatus 210 (FIG. 35) is designed for non-vertically rising stem applications (though it could be used as well in vertically rising stem applications). As can be seen in FIG. 35, open and closed are reversed on the upper face 217 of stem nut analysis protractor apparatus 210 (because needle 14 is on nut 28 and therefore rotates with nut 28, and the upper face 217 is fixed to the top edge 92 of actuator housing 30, the relative movement is the reverse of upper face 17). In FIG. 35, the stem 25 is disposed horizontally.

FIGS. 9-32 illustrate a typical testing process or procedure. It is assumed that the valve stem 25 threads are properly manufactured with a 29° angle to the dimensions detailed in the Machinery's Handbook 25 for ACME Thread Design (see FIG. 7D). Assuming stem threads are cut accurately; measuring percent wear can be used for a variety of ACME thread starts, pitch and lead. Examples are for double thread start G.P. ACME thread stems.

Figure 1:
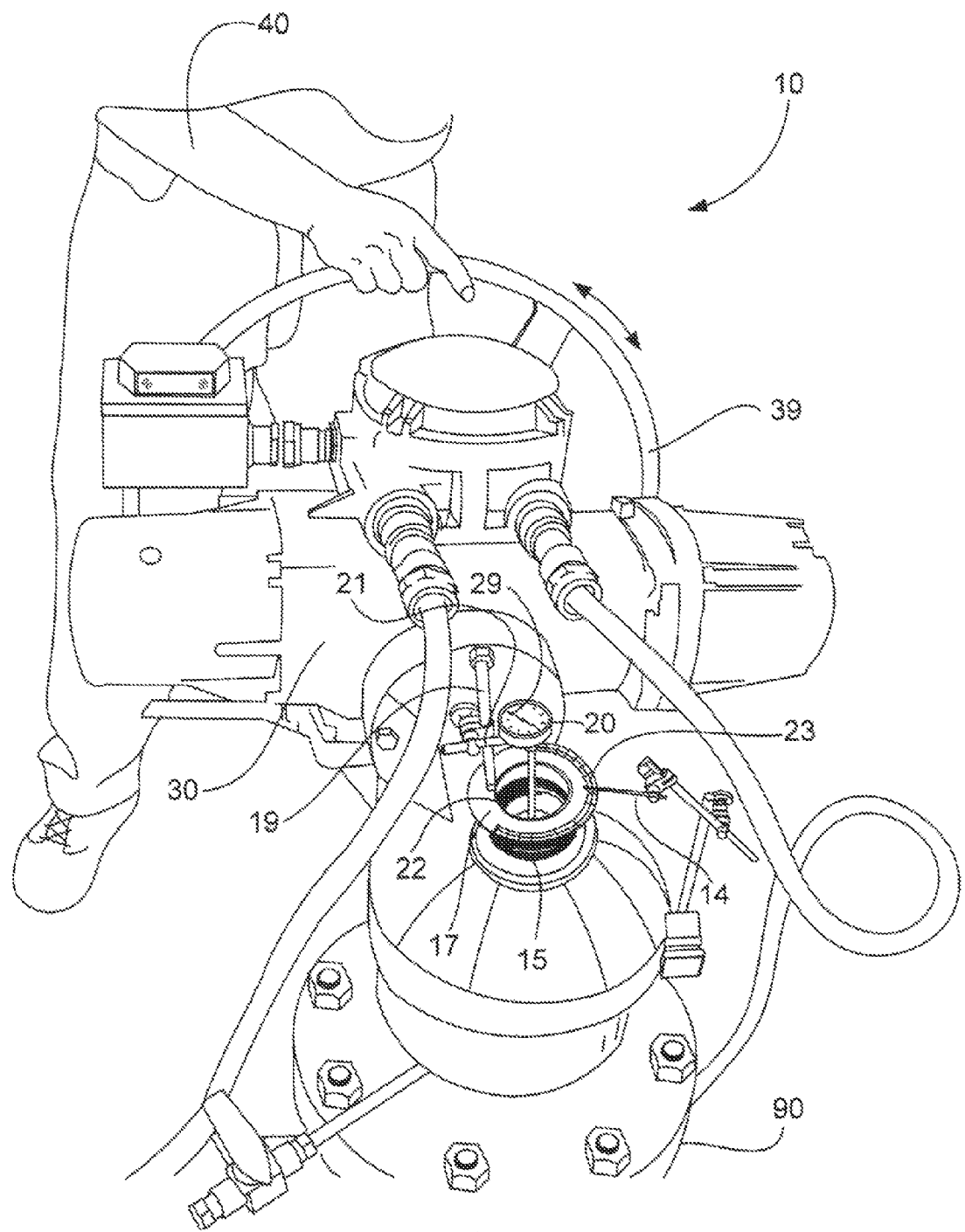
FIG. 1 is a perspective view of a preferred embodiment of the apparatus of the present invention.
Figure 2:
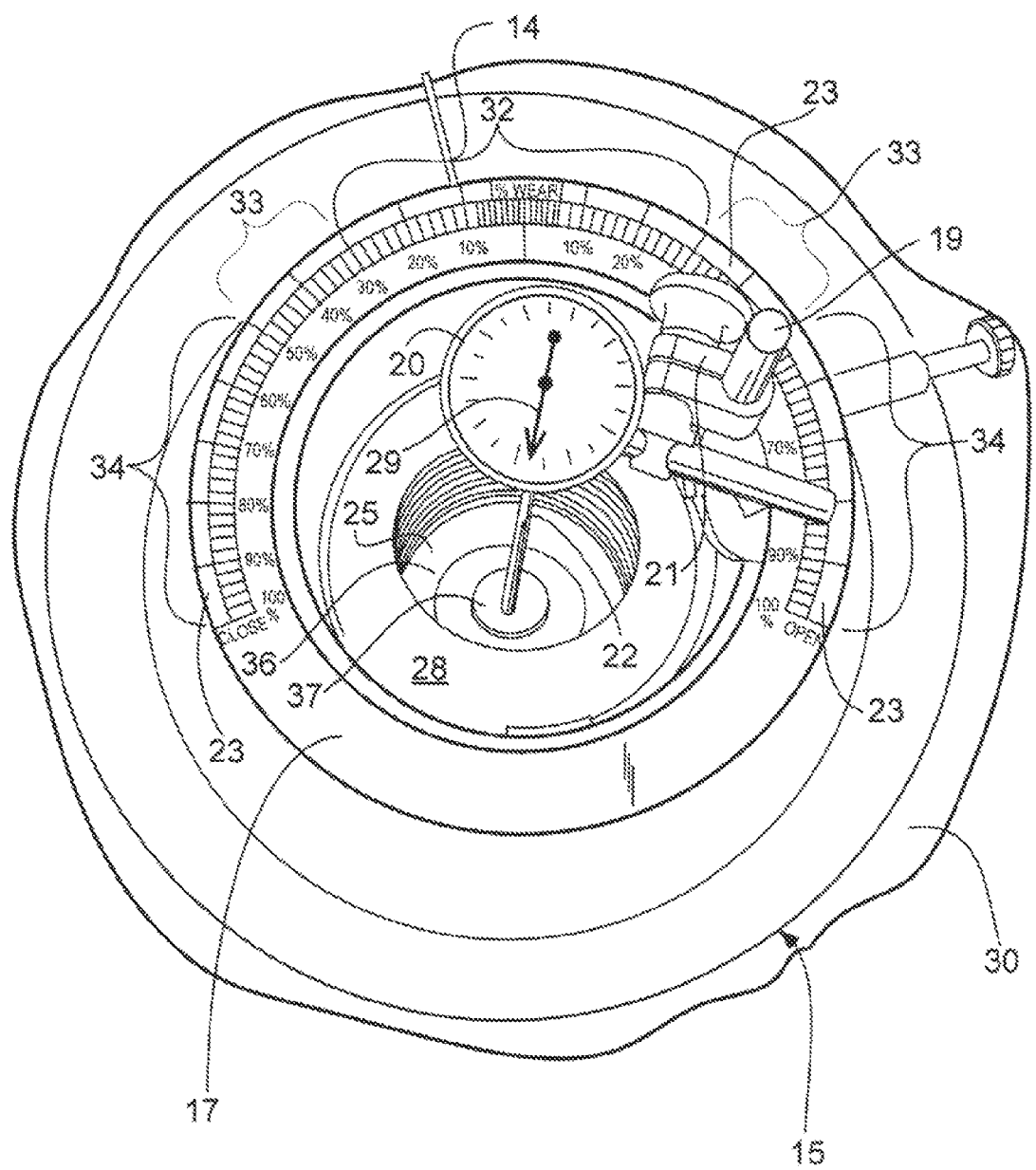
FIG. 2 is a fragmentary perspective view of a preferred embodiment of the apparatus of the present invention.

Certain valve stem orientations will make it more difficult to use the tool shown in FIG. 1. Since gravity is used to keep the tool shown in FIG. 1, and adapters, in contact with the valve stem nut 28, most any valve stem orientation other than vertical up, will make the tool shown in FIG. 1 unusable without some modification (as then gravity alone cannot be used to hold the tool body on the stem nut). The tool shown in FIG. 35 was designed to address this problem.

Instead of using a tool body 15 and adapter(s) 11, 12, 13, 45, 46, 47, 48, a tool post 19 is mounted directly to the top of the stem nut 28 (actually, to the exposed end of the stem nut 28, which might be horizontally disposed or even upside down). This can be accomplished by drilling and tapping the stem nut 28 to receive the tool post 19 threads. A post clamp 72 is affixed to the tool post 19. This post clamp holds the dial indicator 20 and pointer. The dial indicator 20 is positioned adjacent the center of the exposed end 36 of valve stem 25 where it will detect axial stem movement and the pointer 14 is positioned on the post 19 where it will freely rotate with valve 28 to indicate the protractor reading on protractor scale 23. The stylus strike disk 37 can be adhered to the exposed end of the stem nut by adhesive putty, double-stick tape, or any other type of adhesive method. The protractor scale 23 can be on a rigid disk that can be adhered to the upper housing (such as top edge 92—see FIGS. 14 and 15, for example) of the actuator 30 or gearbox of valve 90 where, no matter the orientation, a reading can be made as the post-mounted pointer rotates (see FIG. 35). Possible protractor-mounting techniques could include for example adhesive putty, double-stick tape, or magnet. The tool mounting post 19 is preferably mounted directly to the stem nut 28 with a threaded connection. If drilling and tapping the top of the stem nut 28 is not acceptable, a tapped ring could be made to hold the post 19. The ring could be adhered to the top of the stem nut 28 by adhesive putty, double-stick tape, or any other type of adhesive means or method. There could be several rings with different ID's and OD's that could be mounted as described above, to the top of the stem nut 28 and either removed once the test is complete or, left installed for future testing. The attachment means for attaching the needle 14 and/or the protractor scale 23 can include adhesive, a magnet, magnets, adhesive putty, doublestick tape, a clamp, locking pliers, or drilling and tapping the face(top) of stem nut 28 to mount holding devices directly to the stem nut 28. The pointer 14 could be mounted to the actuator housing 30 utilizing an exposed threaded stud on the actuator if one is available (in which case one could for example attach the pointer 14 with an additional nut and washer). Drilling and tapping for mounting some or all components is an option.

When the apparatus of the present invention is used on a vertically rising valve stem, large adapter 11, medium adapter 12, small adapter 13, and tool body 15 of the apparatus shown in FIG. 8A can be made of metal, such as brass, to have gravity assist it in staying in place. On the other hand, when the apparatus shown in FIG. 8A is to be used in a valve having a different orientation of valve stem, then large adapter 11, medium adapter 12, small adapter 13, and tool body 15 are preferably made of a light-weight material (such as PVC plastic) so that they can be attached to a valve stem nut in for example a horizontal position using for example putty or double-stick tape.

Tool Application

The following is a step-by-step example of how one can use the apparatus of the present invention to measure stem nut wear, and should be read in conjunction with FIGS. 11-32.

I. Preparation
  A. Have operations configure system pressures to minimize the possibility of stem piston effect (reduce line pressure to zero if possible).
  B. If installed, remove the stem protector and stem indication rod.
  C. Electrically, fully open the valve (temporarily lockout and/or tag out valve electrically or place in LOCAL).
  D. Using an approved solvent (CRC "Lectra Clean", or equivalent, for example), thoroughly remove all grease and debris from valve stem.
  E. Record stem data:
    i. Stem diameter: _____ in.
    ii. Stem threads per inch: _____ TPI
    iii. Stem thread starts: _____ Starts.
  F. Using a pitch gauge 60, verify threads per inch (TPI), 29° thread angle, and indications of stem wear/damage (see FIGS. 11-13).
  G. Electrically, fully close the valve (temporarily remove LO/TO (lock out/tag out), close valve, re-instate LO/TO of valve electrically or place in LOCAL).
  H. Declutch the actuator and, using the handwheel 39, ensure the valve is fully seated.

II. Installation of Tool
  A. Remove the stem protector and indication rod, if installed, to provide access to the top of the stem 25 and stem nut 28 (see FIG. 14).
  B. Clean the top of the stem nut as required, facilitating the tool 10 installation.
  C. Place striker disk 37 on top of the valve stem 25 (see FIG. 15).
  D. Select the correct adapter(s), as necessary and place on top of the stem nut 28, where it/they (11-13 and/or 45-48) will freely rotate with the stem nut 28 (see FIGS. 16A-D and 17).
    On smaller adapters 13, the adapter reducer 62 may be required to connect to the protractor 57 (see FIGS. 9, 10, and 18).
  E. Verify proper protractor 57 scale by matching it with the thread starts on the stem, GP or Stub Acme (1 start, 2 starts or 3 starts).
  F. Place the protractor 57 on top of the adapter(s) (45-48) where it will freely rotate with the drive sleeve 28 (see FIG. 19).
  G. Securely screw the dial indicator mounting rod 19 into the opening 58 provided in the top face of the protractor 57 (see arrow 59) (see FIG. 20).
  H. Using the adapter clamp 63, loosely slide the dial indicator 20 on the mounting rod 19 (see FIG. 21).
  I. Select the proper length dial indicator stylus extension(s) (50, 51, 52) and, with contact button 56, securely screw them to the dial indicator 20 as required to contact the striker disk 37.
  J. Secure the dial indicator 20 to its post 19 where the dial indicator stylus is positioned perpendicular to the striker disk 37 and will allow open stem travel (see FIG. 21).
  K. Secure the pointer clamp 54 (shown in the drawings as Vise Grip brand locking pliers) to any actuator hardware or valve 90 within a proximity to where pointer arm 53 can be affixed where its needle 14 can obtain a wear reading (see FIG. 23).
  L. Maneuver the pointer arm 53 where its needle 14 can indicate gauge 57 reading and tighten pointer arm 53 using lever at arm base (see FIGS. 24-25).

III. Data Acquisition—The actuator will typically travel through a lost-motion region as the worm advances the worm gear around the drive sleeve.
  A. With the valve on the seat, slowly open the valve manually (using handwheel 39).
    1. Look for the region where the tool 57 rotates and the stem 25 does not move; this is the backlash region to be measured (see FIG. 26).
      CAUTION: If system pressure causes the stem to rise, the backlash region will not be detected. Bleeding-down the pressure from one side of the valve disk should hold the disk/stem allowing for backlash detection. The stem may rise slightly while taking up the T-Bar clearance.
    2. Continue rotating the handwheel 39 through the backlash region until stem 25 movement is detected on the dial indicator 20 then stop (see FIG. 26).
  B. Rotate protractor 57 where the pointer 14 is on "zero" (see FIG. 27).
  C. Rotate the dial indicator 20 face where its needle 29 reads "zero" (see FIG. 28).
  D. Slowly rotate the actuator handwheel 39 in the close direction until movement is seen on the dial indicator 20 then stop (see FIG. 26). Record percent wear: _____
  E. Rotate the dial indicator 20 face where its needle 29 reads "zero" (see FIG. 28).
  F. Rotate protractor 57 where pointer 14 points to "zero" (see FIG. 27).
  G. Slowly rotate the actuator handwheel 39 in the open direction until movement is seen on the dial indicator 20 then stop (see FIG. 26). Record percent wear: _____
  H. Repeat steps until the open reading corresponds to within 2% of the close reading. Record percent wear: _____ (i.e. if measuring 10% wear on Opening, Close measurement should be between 8% and 12%)

IV. Restore Actuator
A. To restore the valve actuator, remove all test equipment.
B. Restore electric power and electrically open the valve fully (temporarily remove LO/TO, OPEN Valve, re-instate LO/TO of valve electrically or place in LOCAL).
C. Apply adequate amount of approved grease or approved lubricant 61 to stem—(e.g. MOV 1 grease) (see FIGS. 31-32).
D. Electrically, fully close the valve (remove LO/TO, CLOSE Valve, re-instate valve electrically and/or place in REMOTE).
E. Reinstall stem indicator rod and stem protector (if required).
F. Return valve to operations.

Figure 33:
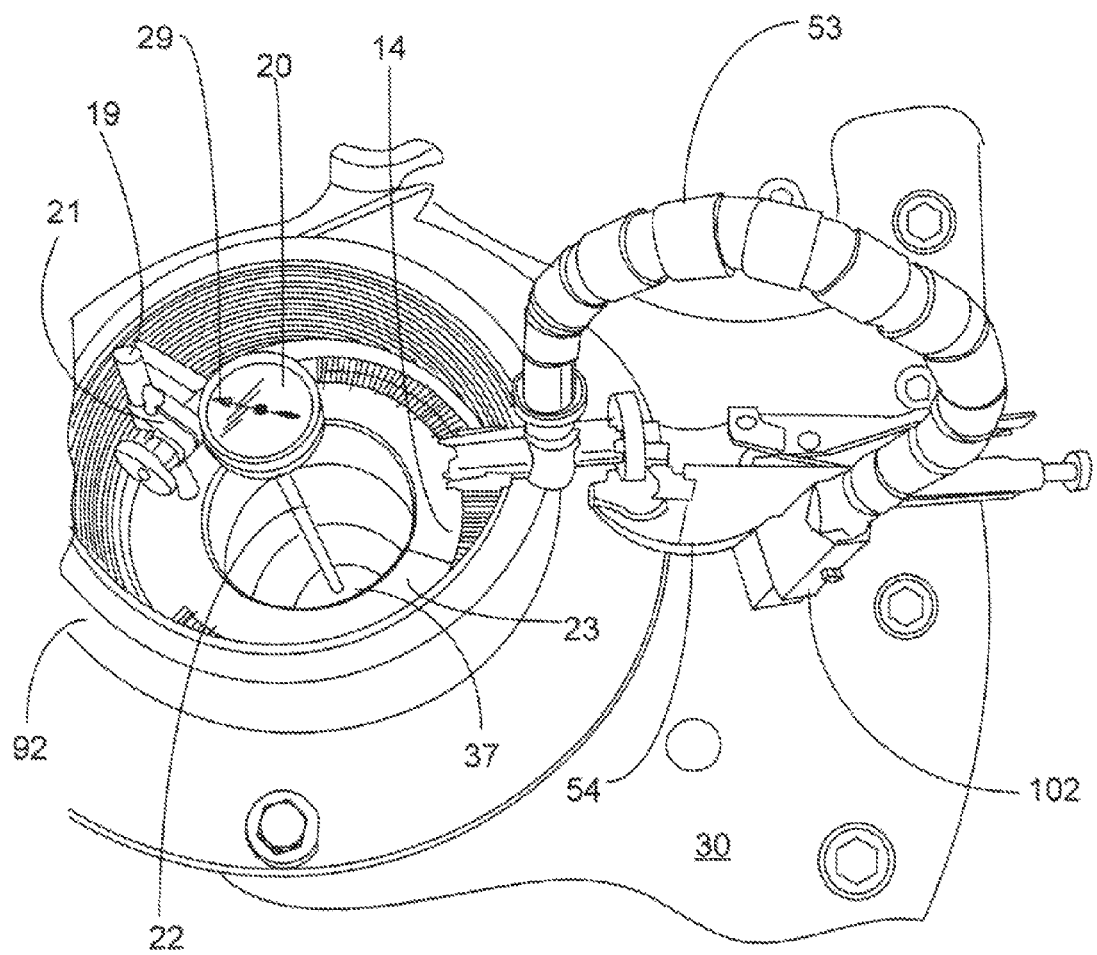
FIG. 33 shows an embodiment of the apparatus of the present invention mounted on a valve.

FIG. 33 shows a version of the apparatus of the present invention where needle 14 is held in place with a clamp device 54 (such as Vise Grip brand locking pliers).

Figure 34:
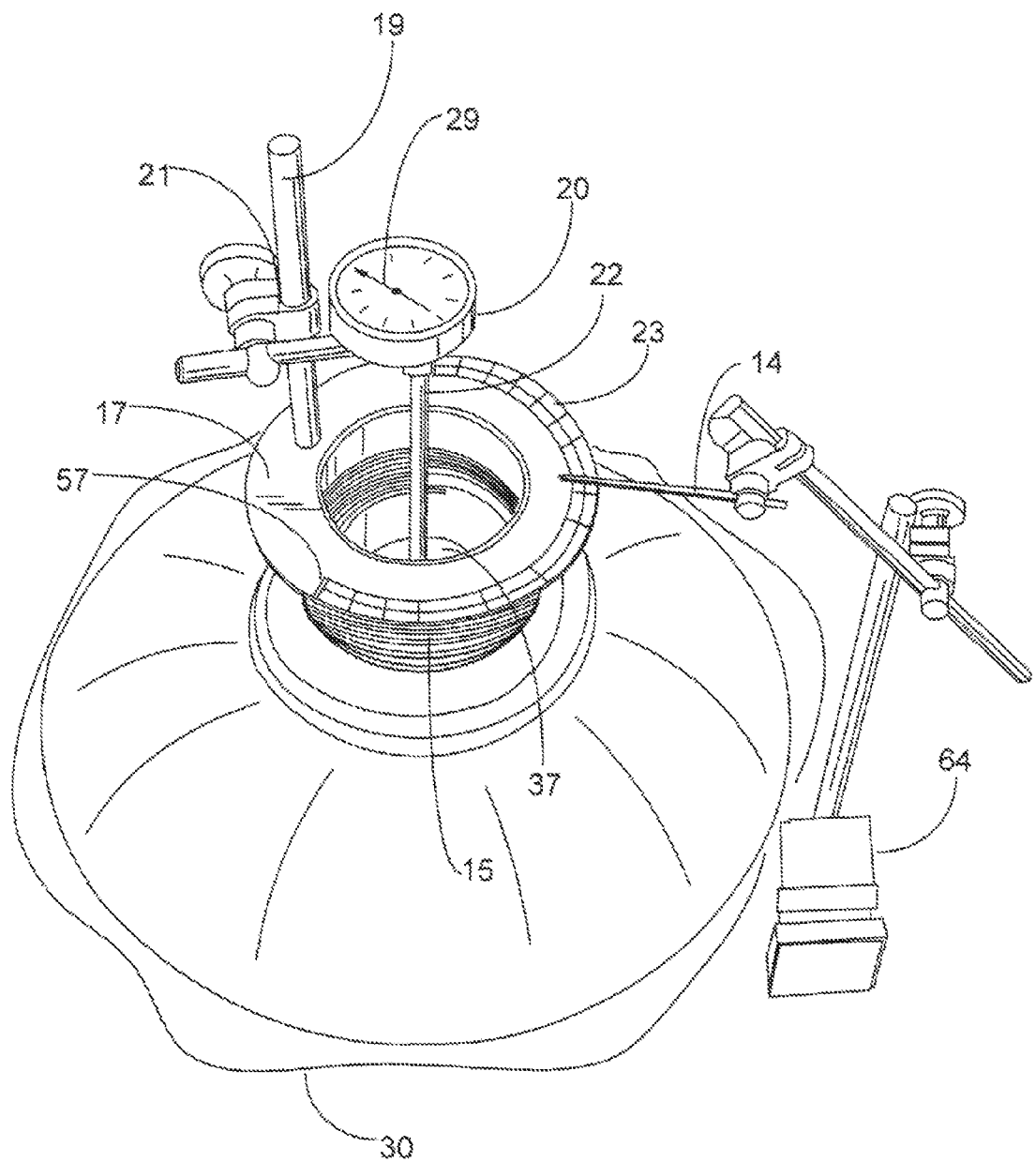
FIG. 34 shows another embodiment of the apparatus of the present invention mounted on a valve, with a different means to hold the pointer.

FIG. 34 shows a version of the apparatus of the present invention where needle 14 is held in place with a magnetic device 64.

FIGS. 6C and 6D show apparatus which can be used to hold a stem 25 against movement before valve nut 28 begins turning. Stem 25 might be disposed to move toward the open position due to pressure in a line or gravity, for example.

To test a stem nut 28 using the method of the present invention, it is best that the valve stem 25 remains stationary. Factors that could cause the stem 25 to move would be system pressure (stem ejection effect) and gravity. These forces can be neutralized by:
1) Dropping the system pressure to a point where the stem ejection force is less than the weight of the stem and disk.
2) Dropping the pressure on one side of the disk creating a differential across the seating surfaces. This should hold the disk in place not allowing the stem to rise (or fall if inverted).
3) Some valves being tested will have an open yoke configuration with a packing gland and follower. Where system pressure cannot be reduced and a differential cannot be created, tightening the packing follower nuts a few flats may increase the packing load enough to keep the stem from rising due to stem ejection force.
4) If the above methods cannot be used to prevent unwanted stem movement, holding the stem by a clamping apparatus could be used. During tool measuring using the present invention, axial stem movement is detected to determine the extent of stem nut backlash; any other stem movement would make accurate measurement difficult. FIGS. 6C and 6D show a Snap-on Tool® (model CG150, CG350, CG450, CG656, or CG750, for example) bar puller (clamp) 80, that is representative of what could be used, to control stem rising (or falling if inverted) during a test conducted with the present invention. This type of clamp 80 is preferably modified with an elastomeric tip (or some other type of spring-loaded tip "soft tip"—such as spring 81 shown in FIGS. 6C and 6D) mounted to the lower end of rod 82. The soft tip will allow the stem to move slightly when the backlash is taken up to give an indication for measurement purposes. The contact tip 81 and rod 82 are preferably slightly offset from stem 25 center to allow for access to the stem by stylus 22 of dial indicator 20 to enable dial indicator 20 to make a reading when stem 25 moves. The measuring apparatus shown in FIG. 1 or FIG. 35, for example, could be used for this setup.

FIG. 6C shows the clamp down apparatus 80 holding stem 25 down against movement until valve stem nut 28 begins moving stem 25. However, there is a spring 81 (or other variable-pressure device, such as elastomeric material, rubber material, or other low durometer value material) which will allow some upward movement of valve stem 25 if enough force is exerted on it. Preferably, the force of spring 81 is enough to overcome the resident upward pressure on stem 25 to rise, but can be overcome when stem nut 28 rotates and attempts to push valve stem 25 upward (see compressed spring 81 in FIG. 6D).

Clamp down apparatus 80 includes a ram adaptor 110, a yoke 111, side rod connecting nuts 112, side rod hexagonal nuts 113, clip/washers 114, cap screws 115, side rods 116, an end block 117, and nuts 118.

In FIGS. 6C and 6D, ram adaptor 110 is positioned on top of yoke 111. Side rods 116, which can be of variable length, are connected to end block 117 by way of nuts 118. Side rods 116 are also connected to yoke 111 by way of both side rod hexagonal nut 113, which are positioned below yoke 111, as well as side rod connecting nuts 112, which sit on top of yoke 111 and provide an option for addition of side rod adaptors. Clips/washers 114 are positioned in between side rod connecting nuts 112 and yoke 111. Cap screws 115 serve as means of attachment for ram adaptor 110 to yoke 111.

After stem 25 is clamped down with clamp apparatus 80, testing of nut 28 with apparatus 10 would proceed as discussed above.

Because a preferred method of the present invention involves cleaning the valve stem prior to testing and re-lubricating the valve stem after testing is performed, the method of the present invention helps to maintain valves in good working order.

The following is a list of parts and materials suitable for use in the present invention:

| Parts Number | Description |
| --- | --- |
| 10 | stem nut analysis protractor apparatus |
| 11 | large adapter |
| 12 | medium adapter |
| 13 | small adapter |
| 14 | stationary pointer |
| 15 | tool body/annular base |
| 16 | threaded section |
| 17 | upper face |
| 19 | post (dial indicator mounting rod-preferably threaded) |
| 20 | dial indicator/axial stem movement indicator |
| 21 | bracket |
| 22 | stylus/rod |
| 23 | indicia/percent wear indicator/backlash |
| 24 | central opening |
| 25 | valve stem |
| 26 | new stem nut |
| 27 | worn stem nut |
| 28 | stem nut |
| 29 | dial indicator arrow |
| 30 | actuator gear box mechanism (actuator) |
| 31 | bottom of stylus |
| 32 | acceptable wear color code |
| 33 | caution wear color code |
| 34 | unacceptable color code |
| 36 | top of valve stem |
| 37 | disk |
| 38 | cup |
| 39 | hand wheel |
| 40 | user/operator/technician |

-continued

| Parts Number | Description |
| --- | --- |
| 41 | pitch |
| 42 | flat dimension at crest |
| 43 | kit |
| 44 | case/container |
| 45 | adapter |
| 46 | adapter |
| 47 | adapter |
| 48 | adapter |
| 50 | stylus extension (2 inches (5 cm), for example) |
| 51 | stylus extension (4 inches (10 cm), for example) |
| 52 | stylus extension (2 inches (5 cm), for example) |
| 53 | pointer arm/flexible holder |
| 54 | clamp/grip/wrench |
| 55 | dial indicator/extension adapter |
| 56 | contact button |
| 57 | protractor/scale |
| 58 | threaded opening |
| 59 | arrow |
| 60 | pitch gauge |
| 61 | grease/lubricant |
| 62 | adapter reducer |
| 64 | magnetic device for holding needle 14 |
| 72 | clamp |
| 80 | clamp apparatus |
| 81 | elastomeric tip or some other type of spring-loaded tip "soft tip"-such as a spring |
| 82 | rod |
| 83 | tip of rod 82 |
| 90 | valve |
| 91 | drilled hole (for stem indicator rod) |
| 92 | top edge of actuator housing |
| 100 | threaded hole |
| 101 | adhesive |
| 102 | mounting assembly (Vise Grip attachment device) |
| 103 | digital vernier caliper |
| 110 | ram adaptor |
| 111 | yoke |
| 112 | side rod connecting nut |
| 113 | side rod hexagonal nut |
| 114 | clip/washer |
| 115 | cap screw |
| 116 | side rod |
| 117 | end block |
| 118 | hexagonal nut |
| 210 | stem nut analysis protractor apparatus for non-vertically rising stem applications |
| 217 | upper face |
| P | pitch |
| X | stem nut thread maximum width |
| $F_{cs}$ | basic flat at crest of the stem thread |

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. An apparatus that indicates valve stem nut wear to an observer, comprising;
   a) a tool body having a lower portion adapted to rotate with a stem nut that is to be measured for wear, said tool body having a scale having indicia of stem nut wear thereon;
   b) an instrument that indicates when the valve stem initiates movement;
   c) a pointer that registers on the scale a stem nut wear value that is based upon an amount of stem nut rotation that occurs prior to axial stem movement when the stem nut is rotated.

2. The apparatus of claim 1 wherein the tool body has an open center portion.

3. The apparatus of claim 2 wherein the instrument extends through the open center portion.

4. The apparatus of claim 2 wherein the instrument occupies at least in part the open center portion.

5. The apparatus of claim 1 wherein the instrument is a dial indicator.

6. The apparatus of claim 1 further comprising a pointer not attached to the tool body, which pointer indicates rotation of the tool body.

7. The apparatus of claim 1 wherein a color coded value indicates whether or not an unacceptable amount of valve stem nut wear has occurred.

8. The apparatus of claim 1 wherein a color coded value indicates whether or not an acceptable amount of valve stem nut wear has occurred.

9. The apparatus of claim 1 wherein the instrument includes a stylus that engages the stem.

10. An apparatus that indicates wear of a valve stem nut to an observer, comprising;
    a) a wear indicator having indicia of stem nut wear thereon;
    b) an instrument that indicates when the valve stem initiates movement;
    c) a pointer that registers on the wear indicator a stem nut wear value that is based upon an amount of stem nut rotation that occurs prior to axial stem movement when the stem nut is rotated;
    d) attachment means for attaching the wear indicator to the valve stem nut or the pointer to the valve stem nut so that either the wear indicator or the pointer rotates with valve stem nut.

11. The apparatus of claim 10, wherein the attachment means includes a tool body which holds the wear indicator to the valve stem nut with gravity.

12. The apparatus of claim 10, wherein the attachment means includes at least one from the group consisting of adhesive, a magnet, magnets, adhesive putty, double-stick tape, a clamp, locking pliers, and a holding device threadably attached to the stem nut.

13. The apparatus of claim 10, wherein the pointer is connected to a valve stem when the wear indicator rotates with the stem nut.

14. A method of measuring stem nut wear in a valve having a valve stem that is connected to a stem nut, comprising the steps of:
    a) providing a wear indicator that indicates a measurement of stem nut rotation;
    b) providing an indicator instrument that indicates to an observer that stem movement has initiated;
    c) rotating the stem nut;
    d) continuing rotation until the stem begins to move, wherein the wear indicator provides to an observer, a value of stem nut wear once stem movement is initiated.

15. The method of claim 14 wherein the further comprises a stem protector that protects the stem and stem nut, and the method of measuring stem nut wear further comprises the steps of:
    removing the stem protector to provide access to the stem and stem nut; and
    mounting a tool body to the stem nut, wherein the tool body rotates when the stem nut rotates, the tool body indicates the measurement of stem nut rotation, and wherein
    the indicator instrument indicates axial stem movement and the tool body provides a reading when the stem begins to move that indicates an amount of stem nut wear.

16. The method of claim 14 furthering comprising
mounting a tool body to the stem nut, wherein the tool body rotates when the stem nut rotates, the tool body including the wear indicator that indicates a measurement of stem nut rotation;
and wherein the indicator instrument contacts the stem, the indicator verifying to an observer that stem movement has initiated.

17. The method of claim 14, wherein the wear indicator is portable.

18. The method of claim 14, wherein the indicator instrument is portable.

19. The method of claim 14, wherein the indicator instrument and the wear indicator are not a part of the valve, and can be used externally to measure wear of many valves.

* * * * *